United States Patent [19]

Mueller

[11] 4,391,666
[45] Jul. 5, 1983

[54] CONTAINER MANUFACTURING MACHINE
[75] Inventor: Martin Mueller, Wonder Lake, Ill.
[73] Assignee: Owens-Illinois, Inc., Toledo, Ohio
[21] Appl. No.: 313,075
[22] Filed: Oct. 19, 1981
[51] Int. Cl.³ .................. B29C 27/20; B32B 31/00
[52] U.S. Cl. .............................. 156/84; 156/86;
  156/184; 156/189; 156/191; 156/218; 156/256;
  156/322; 156/446; 156/447; 156/456; 156/497;
  156/499; 156/510
[58] Field of Search ............... 156/86, 212, 218, 256,
  156/322, 446, 447, 456, 466, 475, 497, 499, 84,
  85, 184, 189, 191, 510; 493/303, 304, 305, 306,
  308

[56] References Cited
U.S. PATENT DOCUMENTS

| 3,252,387 | 5/1966 | Schur | 493/306 |
| 3,969,173 | 7/1976 | Amberg et al. | 156/80 |
| 3,970,492 | 7/1976 | Amberg et al. | 156/218 |
| 4,077,829 | 3/1978 | Pupp et al. | 156/86 |
| 4,310,369 | 1/1982 | Miller et al. | 156/218 |

Primary Examiner—Caleb Weston
Attorney, Agent, or Firm—John R. Nelson; Myron E. Click

[57] ABSTRACT

An apparatus for fabricating a container made of foam sheet material. The apparatus includes a mandrel carrying drum that revolves about its longitudinal axis of symmetry. The drum contains a plurality of individual mandrels in radial alignment. Each mandrel revolves about its longitudinal axis as it forms a cylindrically shaped container blank. The drum carries the mandrels in an arcuate path, thus permitting work to be performed on the container blank as it passes a series of work stations.

A method of forming a container from foam sheet material is set forth wherein a severed sheet material is attached to a mandrel. The mandrel rotates about its axis to form a cylindrically shaped blank as the mandrel itself is being moved in an arcuate path. While positioned on the mandrel, the container blank is worked upon at a plurality of work stations, thus producing a final container with an end closure which may be apertured.

35 Claims, 32 Drawing Figures

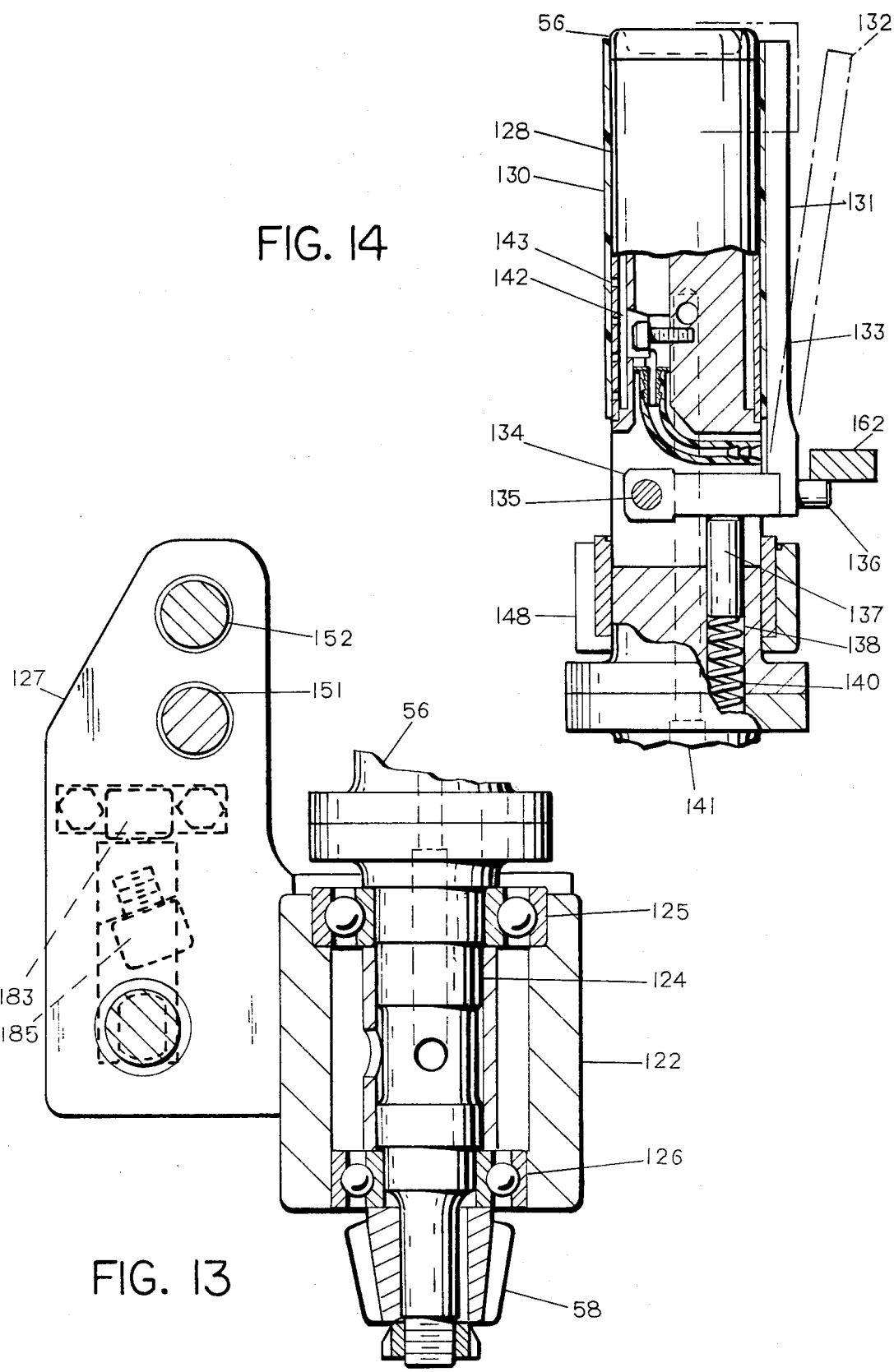

CONTAINER MANUFACTURING MACHINE

BACKGROUND OF THE INVENTION

For quite some time it has been recognized that various containers such as cups and particularly, containers for the dispensing of ice cream treats can be formed from various plastic materials. In addition to plastic materials, one very popular container material has been manufactured from paper products. A well known container of the above mentioned type is the so-called push-up cup which is essentially a cylindrical outer body with a movable plunger positioned on the interior thereof. A stick is attached to the interior plunger, thus permitting the user to push the contents of the push-up cup upward as it is consumed. Cups of the push-up variety have been manufactured not only from paper, but also by the well known injection molding technique. Heretofore, push-cups have not been successfully manufactured from polystyrene beads since a certain degree of strength is required over and above that afforded by the polystyrene beads. In forming cups of the steam chest variety, it has been necessary in the past for purposes of imparting adequate strength and rigidity and surface finish, to construct such cups with a rather thick sidewall and rim. As a consequence of this added sidewall thickness, it is not possible to package as much product per container as can be accomplished when the sidewall is relatively thin. Thus from an overall storage and relative strength position, a more desirable material is dictated.

Paper push-up containers do have the required strength while the paper remains in the dry condition, however, when the paper becomes saturated with an inherently wet product, it rapidly loses its strength.

Another disadvantage of the so-called steam chest molded push-up container is that, as an inherent consequence of its mode of manufacture, the external surface of its sidewall can only be decorated subsequent to the manufacture of the push-up container. The required or necessary post decoration and printing techniques are considerably slower and more expensive than the flexographic and other printing techniques which may be used to decorate various sheet material prior to incorporation into cup-like containers. As a result, the majority of steam chest molded cups on the market today do not contain a decorated exterior simply because such decoration would have to be applied after the cup is fabricated.

Also, cups and cup-like containers have been made of insulated or expanded thermoplastic materials by cutting an appropriate arcuate shaped blank from sheet stock material and forming it into a cylindrical container with techniques that are well known in the art of making paper cups and ice cream buckets. This process of container fabrication permits the container exterior sidewall to be decorated while the plastic or paper material is in sheet form and prior to the cutting of the rectangular shaped sidewall blanks. By controlling the density of such plastic sheet stock, it is possible to fabricate a container with adequate strength, rigidity and liquid impermeability and which has a considerably thinner sidewall than for example a stream chest molded cup. Also, the ease with which the exterior of the sidewall of such containers can be provided with attractive and sometimes required information by predecorating the sheet from which the sidewall blanks are formed, has made it possible for a substantial number of such containers to be decorated in a way which has proven to be quite popular in the trade.

One of the inherent disadvantages of such containers is the fabrication of the return lip on the bottom of the push-up container. This particular return lip geometry requires that the material be moved a considerable distance, thus subjecting it to tears and also cracks which reduce its peripheral strength to a marked degree. Another known type of insulated or expanded thermoplastic container which has met with some measure of commercial success and is somewhat analogous in structure to the push-up container is the one-piece seamless deep draw cup which is manufactured by the well known thermoforming process. Such cups can be formed to a very close manufacturing tolerance and with excellent stacking features, if so desired. Once again, the decoration of thermoformed deep drawn containers must be achieved subsequent to their fabrication.

As can be realized from the foregoing discussion, each of the well known types of insulated containers referred to has certain inherent advantages which make it well suited for some uses and certain limitations which make it less suited than one of the other types for other uses.

Another variation in the manufacture of push-up containers is also feasible at this time. This particular insulated push-up container combines a wide range of desirable properties, without offsetting limitations such as are found in paper cylindrical containers. This new variation of the push-up container is well suited for a wide range of applications for insulated push-up cups. The sidewall of such container can be formed from rectangular blanks, therefore, without any appreciable amount of scrap and extra expense involved in severing special shaped container sidewall blanks from a sheet or web of material. The sidewall of such push-up container may be relatively inexpensively provided with attractive, high quality decorative designs. Additionally, such cup may, if desired, be provided with a very slight taper which enhances the movement of the internally contained plunger which moves the edible product in an upward direction. Relatively inexpensive high quality push-up containers have been fabricated from rectangular shaped blanks. The sidewall of the push-up container is formed from a web of polystyrene or other thermoplastic polymeric sheet material which has a substantial degree of orientation or heat shrinkability built into the so-called machine direction of the web of material. Decorative material is applied to the oriented web of material and after printing, the web is severed into long strips, each containing the repetitive pattern of individual container blanks. The strips of material are then severed into individual container blanks which are then formed into cylindrical sleeves with the machine direction of the parent web extending circumferentially around the push-up sleeves. In the formation of the sleeve, a liquid-type lapped seam is effected by heat or solvent sealing techniques. A sleeve winding mandrel is employed to form the push-up sleeve to the desired diameter and to make the required side seam. The completed sleeve is then placed on a mandrel, if it is not formed in situ on said mandrel, and having an outer forming surface corresponding to the desired configuration of the inner surface of the container sidewall, whether such sidewall be substantially straight or tapered, such as in a cup or push-up container. A portion of the sleeve may be cantilevered over the free end of the mandrel in order to form the rim on the bottom of the push-up container or its entire bottom if so desired. The remaining portion of the sleeve may be conformed to the exterior surface of the mandrel by the application of heat. The fabrication of a one-piece push-up container according to the present invention is effective to provide a container that can be used for frozen or semifrozen food products. Of course, the container also lends itself to edible products that are not frozen but are semiliquid in consistency. The apparatus for fabricating a one-piece push-up container in accordance with the method of the present invention includes a drum mechanism that moves in an arcuate path and carries a plurality of spaced apart mandrels. Each mandrel has an external configuration that corresponds to the internal contour and configuration of the push-up container. The drum carries the attach mandrels through a series of operational subassemblies which function in timed sequence interrelationship with the mandrels to form the container of the present invention. In addition to rotating with the drum, each individual mandrel is capable of rotation about its own axis to effect the winding of cylindrically shaped sleeves from flat webbed sheet stock. With the process and apparatus of the present invention, push-up containers having exceptional properties can be fabricated at a relatively low cost and at high production speeds. Because the operation of the present apparatus is continuous in nature, it is extremely smooth in operation and achieves excellent production speeds during the manufacture of containers.

It is an object of the present invention to provide an apparatus for the manufacture of cup-like containers.

It is an additional object of the present invention to provide a machine for the manufacture of push-up containers manufactured from foamed plastic material.

These and other objects have been attained in accordance with the present invention in that a rotary machine for the manufacture of push-up containers from a thermoplastic material that shrinks in a controlled fashion under the influence of heat is provided for. It is also a feature of the present invention to provide a method and apparatus for thermally fabricating a push-up container from a rectangular blank of oriented thermoplastic material without the need for wasting any portion of the material in such blank. More particularly, it is a feature of the present invention to provide a method and apparatus for fabricating a container from a rectangular blank of oriented thermoplastic material wherein the bottom rim of the push-up container is formed substantially simultaneously with the remainder of the container.

DESCRIPTION OF THE PRIOR ART

Containers of one type or another, particularly in the form of disposable cups, have been produced by different techniques and types of machinery. One such container fabricating machine is shown and described in U.S. Pat. No. 3,969,173 issued July 13, 1976. The machine involves the wrapping of a rectangularly shaped blank of foam sheet material into a sleeve of cylindrical configuration. The blank of sheet stock is fed to a sleeve winding station where the sleeve is wound on the exterior of a hollow cylindrically shaped sleeve winding mandrel. The completed sleeve is then transferred to a shrink mandrel where, under the influence of heat, it is caused to shrink to the external configuration of the mandrel. In this particular instance, a bottom closure is positioned adjacent the edge of the sleeve just prior to shrinkage, thus providing a bottom to the container. The bottom containing container is then passed through a rimming station where a standard bead-type rim is produced on the container. The finished container is then removed from the shrink mandrel. A related container forming apparatus somewhat analogous to the push-up container of the present invention is shown in U.S. Pat. No. 4,053,346 issued Oct. 11, 1977. Cylindrical shaped sleeves fabricated from predecorated rectangular shaped blanks are produced by introducing the leading edge of the rectangular sheet to a vacuum pickup built into a vertically oriented sleeve winding mandrel. The blank is then wound around the mandrel until the leading and trailing edges are in overlapped position. Heat is then applied, along with pressure, to effect a liquid-tight seal along the length of the cylinder. The cylindrical sleeve is positioned within the sleeve and the subsequent application of heat causes the cylindrical sleeve to shrink in controlled fashion into a container. A subsequent pre-positioned rimming station completes the container by forming a standard rim of bead-like appearance. The completed container is ejected from the shrink mandrel. U.S. Pat. No. 3,970,492 issued July 20, 1976, sets forth the method of producing a container wherein a rectangular sheet of thermoplastic material is formed into a tubular shape having overlapped end portions that are sealed together by directing heated air between the end portions to soften the facing surfaces and pressing the end portions together to form a seam. A two-piece container can be formed by sealing a bottom disk member of foam material to the end of the sidewall, and a one-piece container can be formed by collapsing and fusing the end of the sidewall sleeve to close and form the bottom of the container.

Another related U.S. Pat. No. 3,995,740 issued Dec. 7, 1976, sets forth the article in the form of a container produced from a lapped, seamed cylindrical sleeve. Either a two-piece or one-piece container is disclosed.

U.S. Pat. No. 4,072,549 issued Feb. 7, 1978, sets forth an apparatus and method for the manufacture of a container made from a cylindrical sleeve. That particular sleeve is conventional in form, however, it is wound on a mandrel that has its longitudinal axis oriented in a horizontal attitude.

A one-piece container is shown in U.S. Pat. No. 4,108,347 issued Aug. 22, 1978. The container is produced by permitting a sleeve of oriented sheet stock to protrude over the end of a shrink mandrel and form an elongate neck portion of small diameter. Subsequent pinching shut the elongate neck, removal of the resulting moil, and pressing of the bottom results in a container which can be rimmed by conventional techniques.

Yet another technique and apparatus for the formation of a foam sheet stock container is to be found in U.S. Pat. No. 4,007,829 issued Mar. 7, 1978. A cylindrically shaped sleeve is formed on a mandrel and a bottom closure is positioned within the confinement of one end of the sleeve. While remaining on the mandrel upon which it was wound, the sleeve and pre-positioned bottom closure are subjected to heat, thus shrinking the sleeve into conformity with the mandrel. Subsequent pressure applied to the bottom of the container assures the integrity of the seal between the sidewall of the container at the bottom of the closure.

Another approach to the formation of a container made from a rectangular sheet of foam material is set forth in U.S. Pat. No. 4,121,402 issued Oct. 24, 1978. In this version of container manufacture, the rectangular blank is severed from its continuous strip. The blank is then translated, at a right angle to its original direction, to an elongate stationary mandrel where the blank is essentially progressively folded about the mandrel as it moves beneath and along the mandrel. The completed sleeve is coupled with an end closure, placed on a shrink mandrel and subsequently formed under the influence of heat into a container.

Another version of a container forming apparatus is to be found in pending patent application Ser. No. 092,892, filed Nov. 9, 1979 now U.S. Pat. No. 4,298,331. The apparatus of this particular invention comprises a framework that supports a motor driven drum adapted for stopping at predetermined arcuate intervals as it revolves about a central axis of revolution. The drum supports an array of radially oriented shrink mandrels. Seamed sleeves of oriented plastic material are preformed and are then positioned in telescope fashion over the mandrels that protrude radially from the drum. A portion of the sleeve is permitted to protrude beyond the free end of the mandrel. The mandrel and its accompanying sleeve is translated through an arcuate path that subjects the sleeve to selected treatment of heat from adjacently mounted heat elements, thus causing the oriented sleeve to shrink in a controlled manner to a configuration similar to the mandrel exterior. That portion of the sleeve cantilevered beyond the end of the mandrel shrinks into a small diameter tubular structure that is closed by the compressive action of a bottom pinching mechanism. Subsequent to the closing of the bottom of the bottom of the heat softened sleeve, the mandrel carrying the sleeve is moved to a work station where the pinched bottom material is compressed against the end of the mandrel to form a liquid-tight bottom in the sleeve. The force utilized in forming the container bottom is also used to form an upset rim on the container. The mandrel carrying the completed container is then indexed to an eject station where the finished container is removed from the mandrel upon which it was formed.

SUMMARY OF THE INVENTION

As can be ascertained from the foregoing discussion, each of the known types of insulated plastic material containers referred to has certain advantages which make it well suited for certain particular uses, and certain limitations which make it less well suited than one of the other types for other uses. The apparatus, according to the present invention, is well suited for the fabrication of a one-piece push-up container. The container is essentially cylindrical in configuration although it may be tapered if so desired. The present invention comprises a framework that supports a motor driven drum adapted for stopping at predetermined arcuate intervals as it revolves about a central axis of revolution. The drum supports a series of radially oriented shrink mandrels. Each shrink mandrel can rotate about its individual axis. A ribbon of oriented plastic material is directed toward each mandrel at a loading station. A selected length of plastic material is severed from the ribbon and is grasped by the mandrel and wound by the revolution of the mandrel as the mandrel, in turn, is carried through an arcuate path by the movement of the drum upon which it is supported. As the mandrel and its accompanying sleeve is translated through an arcuate path, the sleeve is subjected to a selected amount of heat, thus causing the sleeve to conform to the exterior of the mandrel. In addition, a portion of the sleeve that extends beyond the mandrel is shrunk around the end of the mandrel and softened so that the bottom rim of the push-up container can readily be formed. After the formation of the bottom rim of the push-up container, it is then ejected from the mandrel and carried by pneumatic means to another work station remote from the present apparatus.

BRIEF DESCRIPTION OF THE DRAWINGS

FIG. 13 is an elevational view, part in section, looking in the direction of lines 13—13 of FIG. 1 which shows the mandrel, its power source, and attachment to the mandrel casting assembly and drum.

FIG. 14 is an elevational view, part in section, taken along lines 14—14 of FIG. 7 which shows the mandrel and its associated finger mechanism.

DETAILED DESCRIPTION OF THE INVENTION

While the present invention sets forth that preferred embodiment of exemplary apparatus components and methods for the fabrication of push-up containers, it is to be understood that there can be certain variances in portions of the apparatus without limiting the invention to the specific embodiments illustrated and described. The scope of the invention is to be found in the appended claims.

Figure 1:
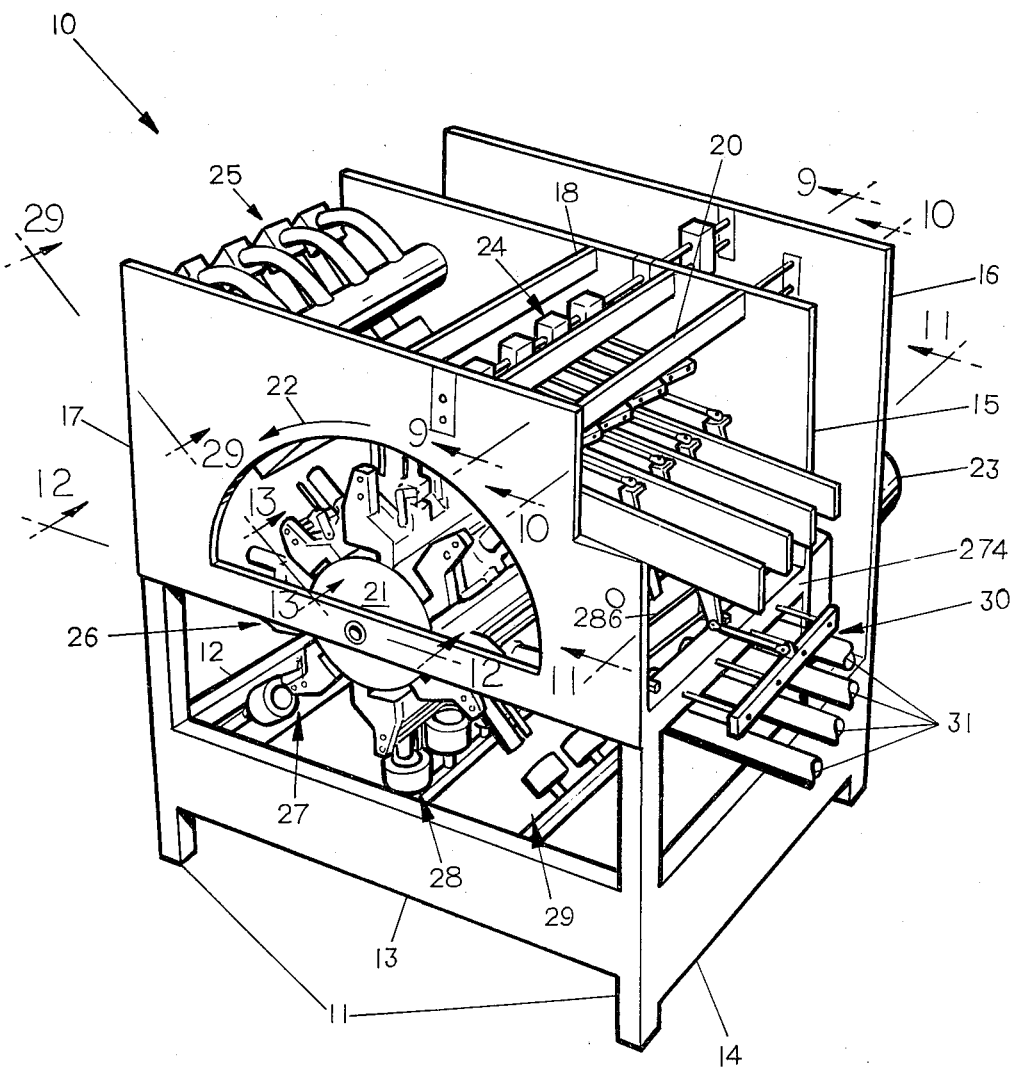
FIG. 1 is an overall perspective of the container forming apparatus with some of the parts removed for clarity.

FIG. 1 sets forth in perspective view the overall apparatus of the present invention. The numeral 10 has been assigned to represent the apparatus in its entirety. The overall support structure for apparatus 10 rests upon legs 11. The legs 11 are stabilized by lower horizontal members 12, 13 and 14. The remainder of the rectangular framework is tied together by means of vertically positioned intermediate plate 15 and rear plate 16. In addition to plates 15 and 16, a front plate 17 is attached to and continues vertically upward as an extension of legs 11. The front plate 17 is held in parallel orientation with respect to intermediate plate 15 by horizontally disposed cross members 18 and 20. A rotatable drum assembly 21 is horizontally aligned and mounted between front plate 17 and intermediate plate 15. The drum 21 rotates in a counterclockwise direction as noted by arrow 22. The drum 21 is rotated by means of a motor 23 which in turn is suspended from rear plate 16. The drum assembly 21 is geared in such a manner so that it will move through 8 stops or stations as it traverses 360 degrees in a counterclockwise direction. A web feeding station is located at the top station identified by numeral 24. A heat sealing station 25 is located 45 degrees in a counterclockwise direction from web feeding station 24. Station 3, while not identified in FIG. 1, is positioned 90 degrees in a counterclockwise direction from web feeding station 24. A partial ejection station 26 is positioned 135 degrees from the top station or web feeding station 24. The partially ejected articles, carried by the mandrels positioned on the rotatable drum assembly 21, then pass through heat applying stations 27, 28 and 29. A takeout station is depicted at numeral 30 or 270 degrees in a counterclockwise direction from feeding station 24. The completed articles are removed from the overall apparatus 10 by means of pneumatic tubes 31.

THE POWER UNIT

Figure 2:
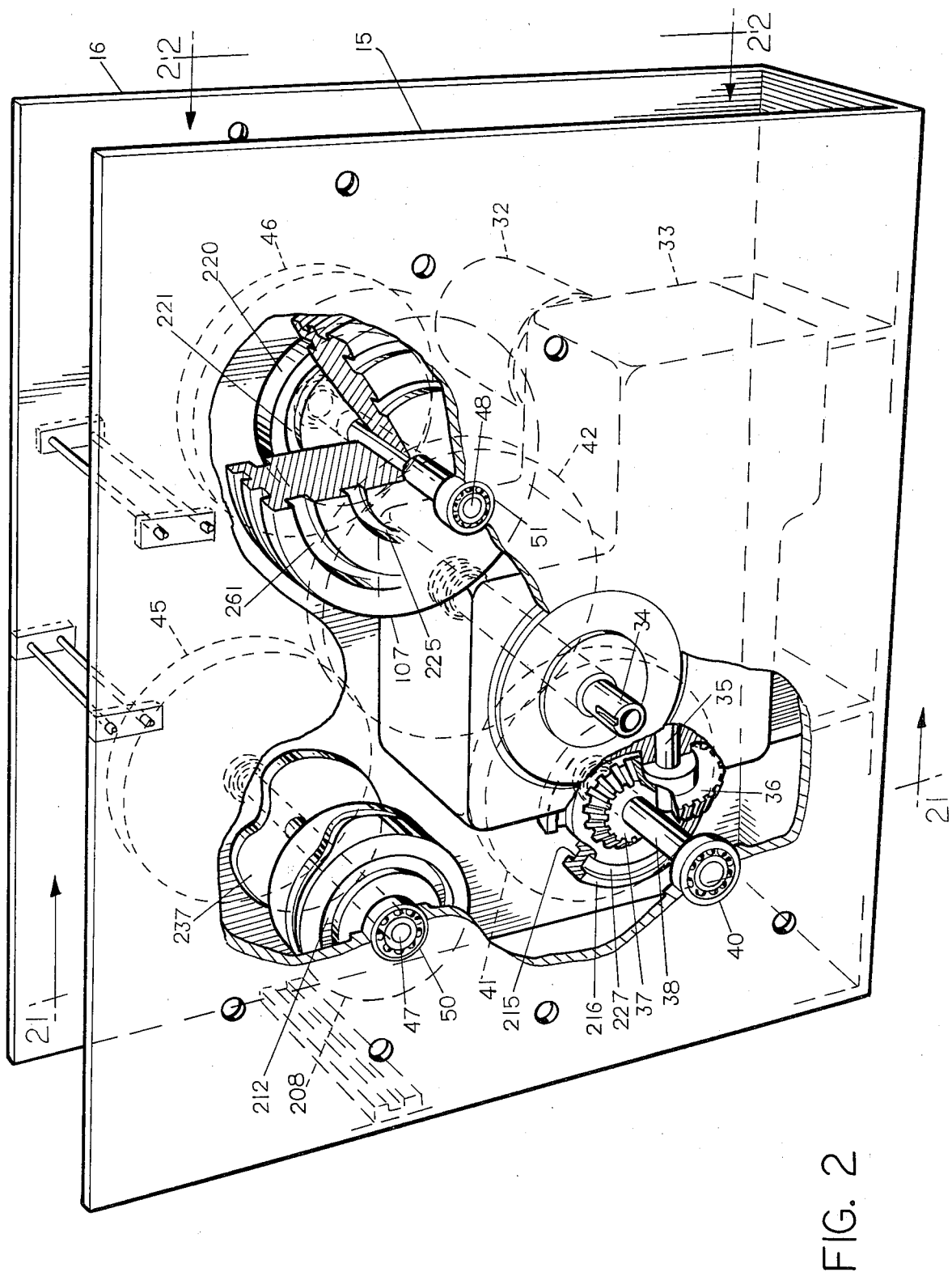
FIG. 2 is a perspective view, part in section, of the rear vertical support plates and the gear drive train mounted therein.

FIG. 2, shows in perspective, the power unit assembly and associated gears that are supported between rear plate 16 and intermediate plate 15. A high torque motor 32 is mounted in a horizontal attitude from gear box 33. The gear box 33 is attached to upright gear and intermediate plates 15 and 16 by fasteners not shown. The gear box 33 has two power takeoffs available. The first power takeoff is centered about shaft 34 which protrudes in the horizontal direction from front to rear of the apparatus as shown in FIG. 2. The second power takeoff exits gear box 33 by way of shaft 35 which is also horizontally aligned but at right angles with respect to shaft 34. The entire gear box or index drive assembly is a standard off-the-shelf part which may be purchased from a manufacturing company such as for example CAMCO, a division of Emerson Electric Company out of Chicago, Illinois. The gear box assembly 33 employs within its structure a cam driven arrangement which permits the power takeoff surrounding shaft 34 to stop 8 times during one complete revolution. The utilization of this 8 stop drive mechanism will be described later. The second drive shaft 35 actually revolves continuously and is attached at its terminal end to miter gear 36. The miter gear 36 in turn meshes with a complementary miter gear 37. Miter gear 37 is rigidly affixed to drive shaft 38 which is assembled in bearing supports positioned in intermediate plate 15 and rear plate 16. One of the bearing supports is shown at 40 in intermediate plate 15. The drive shaft 38 protrudes beyond the rear surface of rear plate 16; at this location a large drive gear 41 is attached to drive shaft 38. Thus drive gear 41 receives its power through miter gears 36 and 37 which in turn are coupled to gear box 33.

Figure 3:
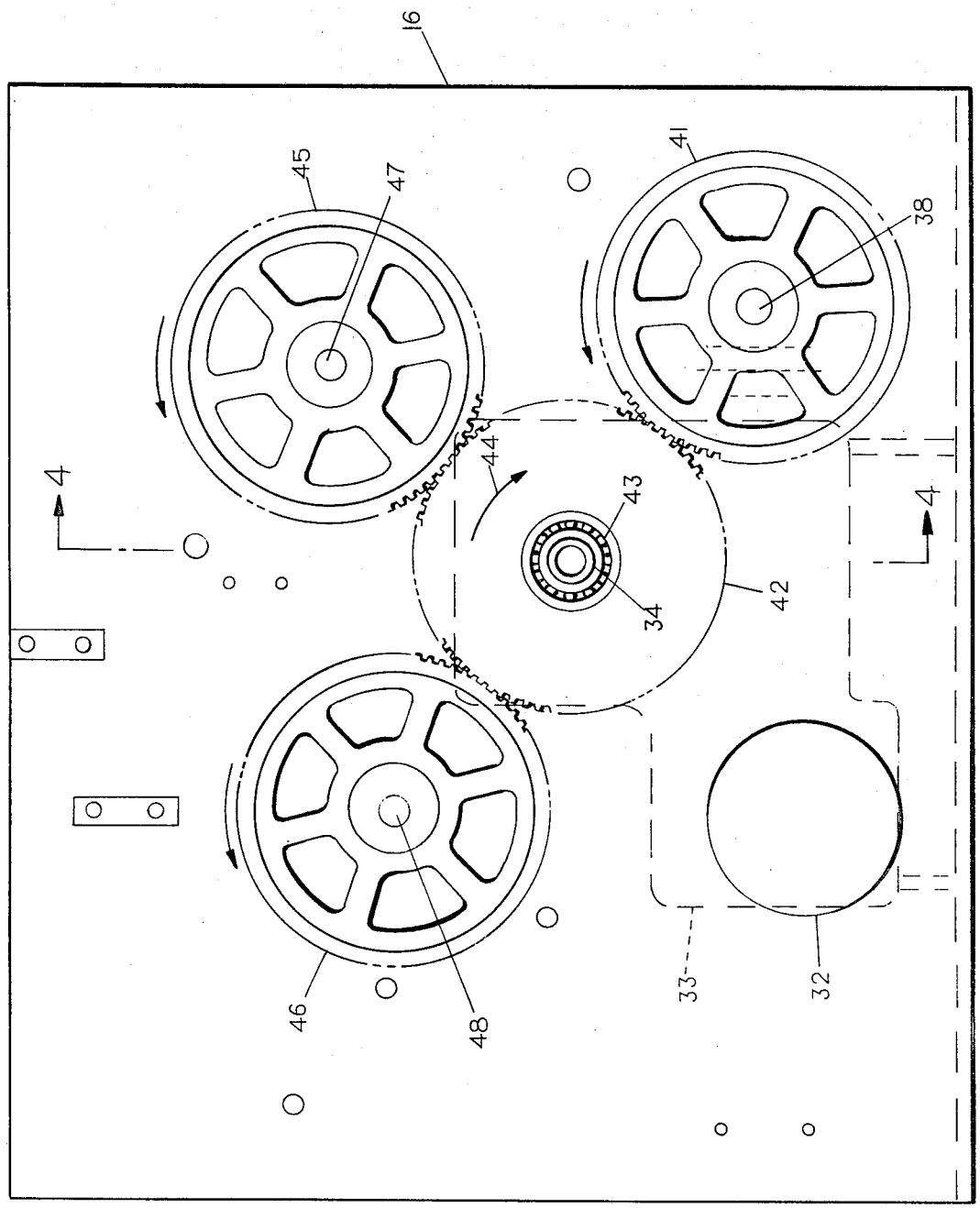
FIG. 3 is an elevational view looking toward the back side of the rear vertical support plate.

Referring to FIG. 3, which is a view looking toward the backside of rear plate 16, the previously mentioned drive gear 41 can be seen at the lower right hand side of FIG. 3. Drive gear 41 is meshed with idler gear 42 which is positioned toward the center of rear plate 16.

The shaft 34 can be seen protruding from the center of idler gear 42. The idler gear 42 is not rigidly attached to the drive shaft 34 but revolves freely about it on bearing 43. The direction of rotation, that is, clockwise, is shown by arrow 44 for idler gear 42. In addition to meshing with drive gear 41, idler gear 42 also is in rotational engagement with cam gear 45 and cam gear 46. Cam gear 45 is rigidly attached to shaft 47 and cam gear 46 is similarly attached to shaft 48. Shaft 47 and 48 are mounted for rotation in rear plate 16 and intermediate plate 15.

Returning once again to FIG. 2, bearing 50 can be seen in the upper left portion of the figure. Bearing 50, of course, is used in association with shaft 47 and likewise, bearing 51 is used to support shaft 48.

As was shown in FIG. 3, shaft 34 provides the support for idler gear 42 which is positioned at the rear of plate 16. In addition to supporting gear 42, shaft 34 also extends in a forward direction through intermediate plate 15 and terminates at its most forward end supported in front plate 17 as can be seen in FIG. 1. A drum assembly 52 is mounted in concentric relationship with shaft 34 and partially supported therefrom.

Figure 4:
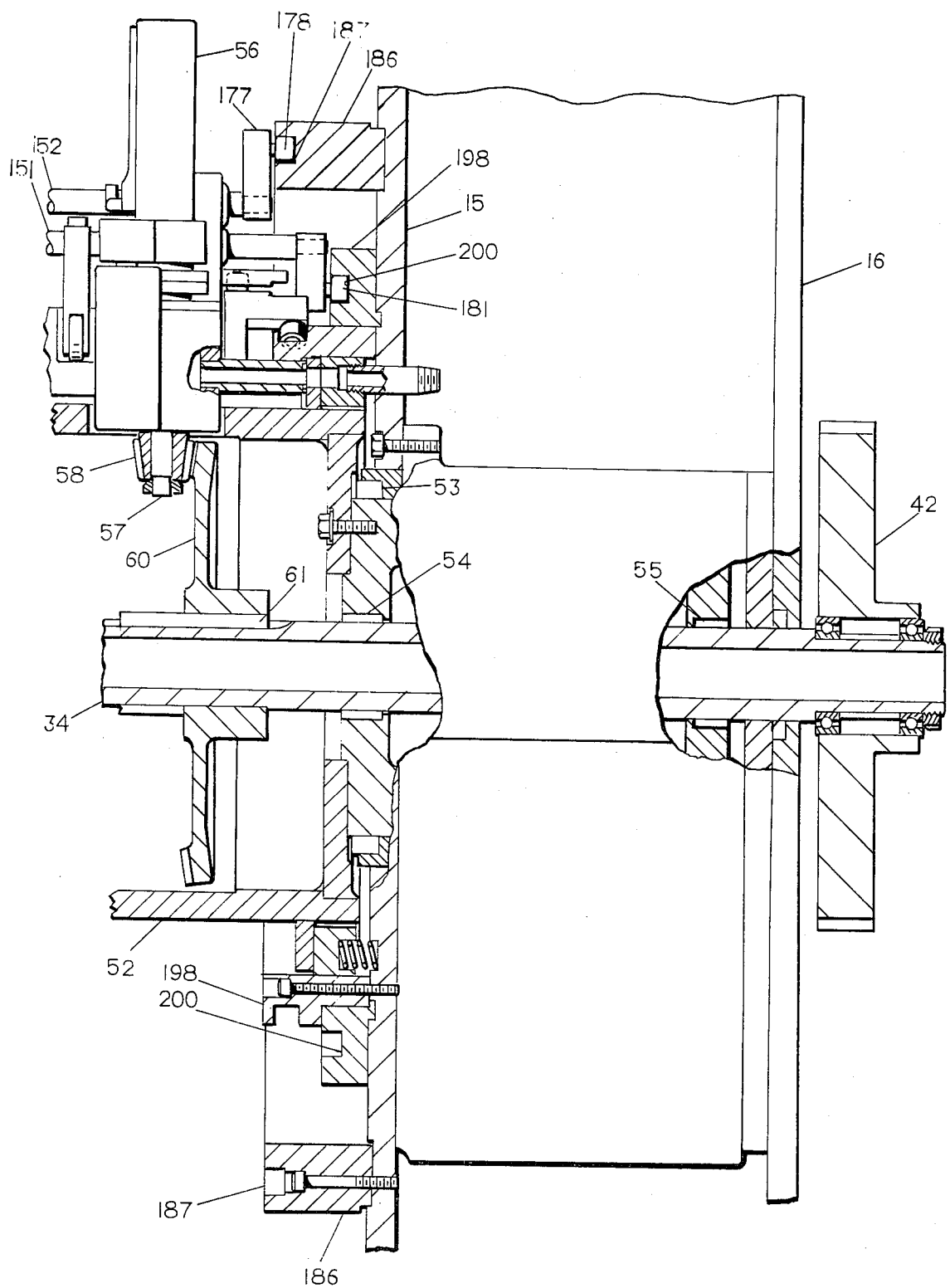
FIG. 4 is a vertical view shown in section and taken along the lines 4—4 of FIG. 3.

FIG. 4, which is a sectional view taken along the lines 4—4 of FIG. 3, shows the drum assembly 52 and its relationship with shaft 34. The drum assembly is mounted for rotation and is powered by gear box 33 by means not shown. The drum assembly is also supported by main bearings 53 as stabilized by sleeve bearings 54 and 55 as shown in FIG. 4. Drum 52 contains an array of radially aligned mandrels 56. The mandrels 56 are mounted to the exterior shell of drum assembly 52 as will be described more fully elsewhere. The mandrel shaft 57 is rigidly attached to and in axial alignment with mandrel 56. A small miter gear 58 is attached to the innermost extremity of mandrel shaft 57. The miter gear 58 in turn meshes with stationary gear 60 as shown in FIG. 4. The stationary gear 60 is mounted on shaft 34 and immobilized thereto by key 61. As will become apparent in the following description of the invention, there are four stationary gears 60 in spaced relationship one from the other along the extent of shaft 34 and the drum assembly 52.

When the drum assembly 52 rotates under the power delivered from gear box 33, the mandrels are carried in a circumferential direction. As the mandrels move through their arcuate path, the miter gear 58 is forced to rotate because it is tracking the gear teeth positioned on the periphery of stationary gear 60.

Figure 5:
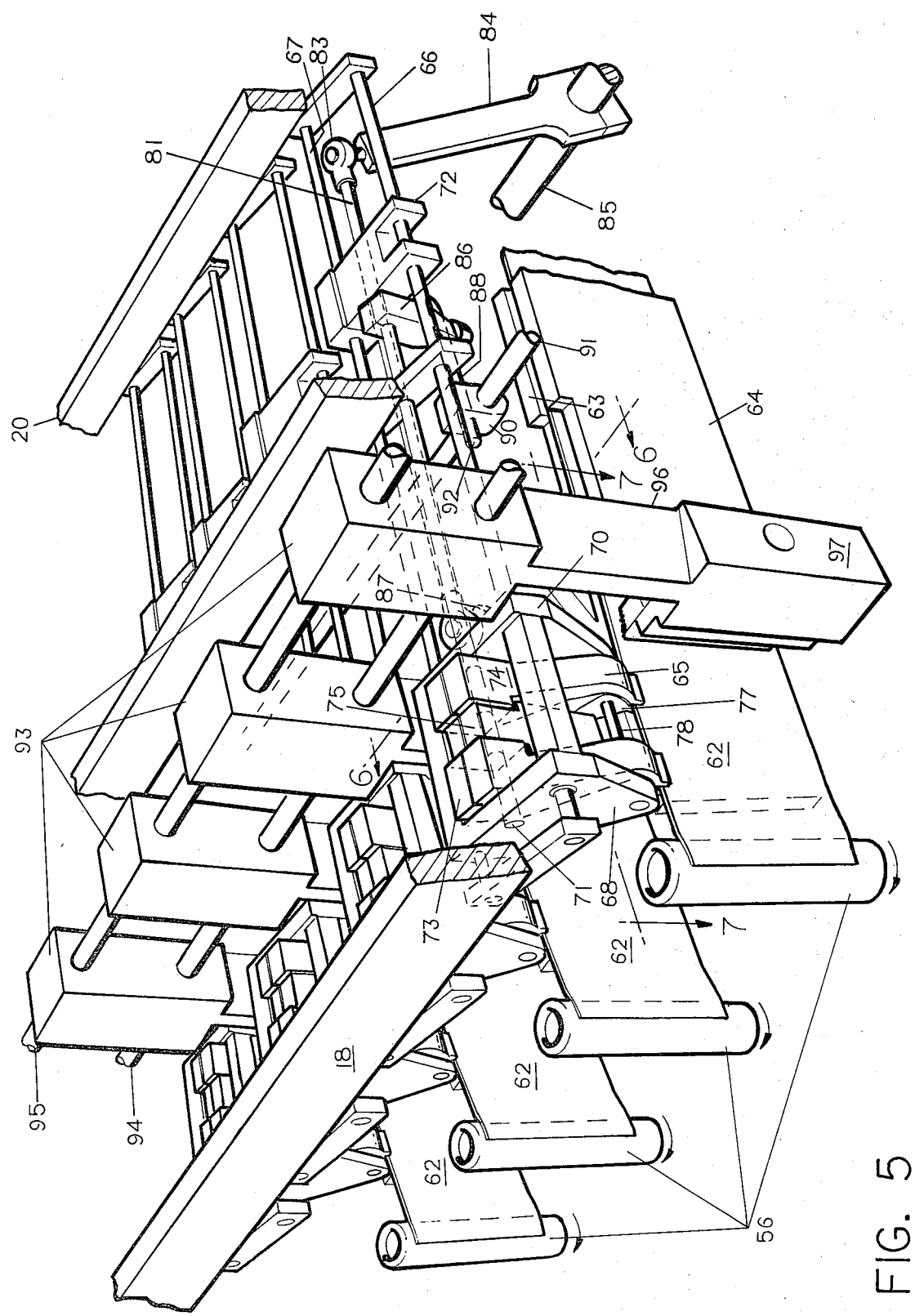
FIG. 5 is a perspective view, part in section, of the material infeed and severing mechanism.

FIG. 5 is a perspective view, part in section, which shows more in detail the web feeding station 24 as earlier depicted in FIG. 1. While the drum assembly 52, previously shown in FIG. 4, is not present in FIG. 5, the mandrels 56 are shown in their position for receiving the leading edge of the web of foam sheet material 62. The foam sheet material 62 is fed from rolls (not shown) which actually form no part of the present invention. The foam sheet material 62 is first fed to a preheat zone identified by members 63 and 64. The foam sheet material 62 passes between preheat members 63 and 64 where heat is introduced into the sheet material in order to make it more readily deformable as it is wound on mandrels 56. The heat for members 63 and 64 can be supplied by electrical resistance wires embedded or on the surfaces of members 63 and 64. The foam sheet material 62 is advanced in an intermittent fashion toward mandrels 56. The intermittent movement of foam sheet material 62 is controlled by grasping the sheet material at the top edge thereof and advancing it in and through preheat members 63 and 64. FIG. 5 shows the grasping mechanism 65 in its fully forward position just prior to the release of foam sheet material 62. The grasping mechanism 65 is mounted for reciprocal motion on parallel oriented support rods 66 and 67. The grasping mechanism 65 is comprised of two parallel plates 68 and 70 which are in spaced apart relationship to one another and mounted for movement on support rods 66 and 67. A torque rod 71 is supported for rotation in plates 68 and 70. The torque rod 71 extends beyond plate 70 in a rearward direction and terminates in sliding support block 72. Sliding support block 72 is also mounted on support rods 66 and 67 for reciprocal motion in unison with grasping mechanism 65. As torque rod 71 traverses the space between support plate 68 and 70, two clamp fingers 73 and 74, in addition to control arm 75, arm firmly clamped to torque rod 71.

Figure 6:
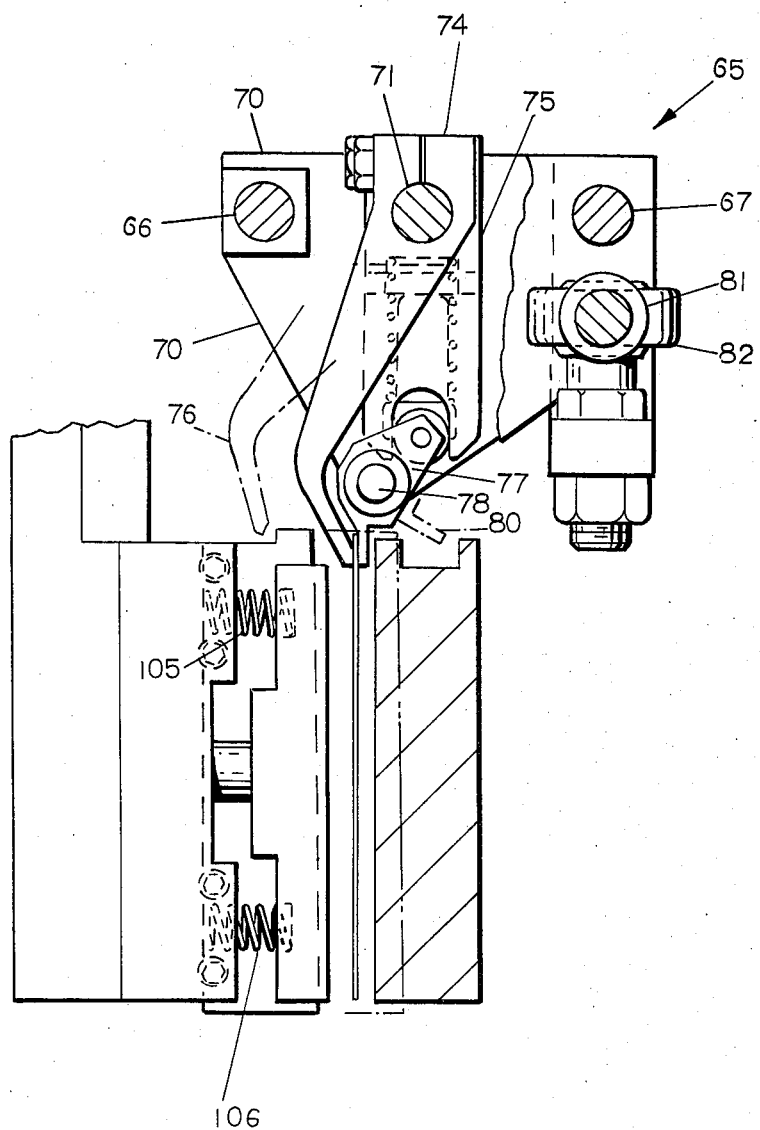
FIG. 6 is an elevational view, part in section, of the material grasping mechanism taken along the lines 6—6 of FIG. 5.

Referring now to FIG. 6 which is a cross sectional view taken along lines 6—6 of FIG. 5, the actual operation sequence of the grasping mechanism 65 can be better understood. A clockwise movement of torque rod 71 causes clamp fingers 73 and 74 to move away from a contacting position against the top exterior side edge of foam sheet material 62. The fully extended or open position of clamp fingers 73 and 74 is shown in dotted lines at 76. Control arm 75, which is also firmly clamped to torque rod 71, moves in unison with clamp fingers 73 and 74. As control arm 75 moves in a clockwise direction as viewed from FIG. 6, the lower bifurcated end of control arm 75 moves small finger mechanism 77 in a counterclockwise direction about its support rod 78. The counterclockwise rotation of small finger mechanism 77 permits the small fingers 80 to move away from the top edge of foam sheet material 62. The support rod 78 is mounted in the lower extremities of plates 68 and 70 as shown in FIG. 5. When torque rod 71 is moved in a counterclockwise direction, clamp fingers 73 and 74 move toward the surface of foam sheet material 62. Likewise, control arm 75, in its counterclockwise movement, causes its lower end to bias against small finger mechanism 77 and causing it to rotate in a clockwise direction about support rod 78, thus bringing small finger 80 into contact with the opposite edge of foam sheet material 62. In this position, the grasping mechanism 65 is able to translate foam sheet material 62 a prescribed distance according to the overall movement of grasping mechanism 65 as it traverses its linear extend along support rods 66 and 67.

The movement of grasping mechanism 65 along support rods 66 and 67 is controlled by a push rod 81. The push rod 81 is shown in FIG. 6 in cross section as it attaches to the back side of plate 70. Push rod 81 is gimbaled in its end connection by a universal joint 82. Referring now to FIG. 5, the overall extent of push rod 81 can be seen. An additional universal joint 83 is attached to the rearmost end of push rod 81. The universal joint 83 is mounted on the cantilevered end of a bell crank arm 84. The bell crank arm 84 is clamped to actuating rod 85. The control of the clockwise and counterclockwise movement of actuating rod 85 will be discussed hereinafter. Returning now to the grasping mechanism 65 and the torque rod 71 mounted therein, two toggle arms 86 and 87 are clamped, in spaced apart relationship from one another, to torque rod 71. When the grasping mechanism 65 reaches its fully forward position, the clamp fingers 73 and 74, along with small finger mechanism 77, are in a position to release their grasp upon foam sheet material 62. The torque rod 71 is rotated in a clockwise direction, as viewed from FIG. 6, by means of the action of pawl 88 against the cantilevered end of toggel arm 86 which in turn is firmly clamped to torque rod 71. Pawl 88 is mounted on attachment block 90. When grasping mechanism 65 reaches its rearmost extent the open clamp fingers 73 and 74, as well as small finger mechanism 77, are in a position to be closed upon a new length of foam sheet material 62 and thus pull it forward toward the mandrels 56. When in the rearmost position, grasping mechanism 65 and its associated torque rod 71 are actuated by the reciprocal action of push rod 91. As push rod 91 reverses its direction, pawl 92 acts against the cantilevered end of toggel arm 87, thus causing torque rod 71 to move in a counterclockwise rotation. The controlling mechanism for the reciprocating motion of push rod 91 and the torquing of actuating rod 85 will be described later.

In addition to the mechanism which advances the foam sheet material 62 in an intermittent fashion from a source to the mandrels 56, there is also shown the mechanism which severs individual pieces of foam sheet stock material just prior to its introduction to the mandrel. An overhead support block arrangement is shown in FIG. 5. The support blocks 93 are supported on parallel oriented horizontal rods 94 and 95. The rods 94 and 95 are supported for reciprocal motion which will be described elsewhere. The support block 93 contains a downwardly protruding column 96 which in turn is attached to the knife block 97. The knife block 97 and its associated parts can best be seen in the following figures.

Figure 7:
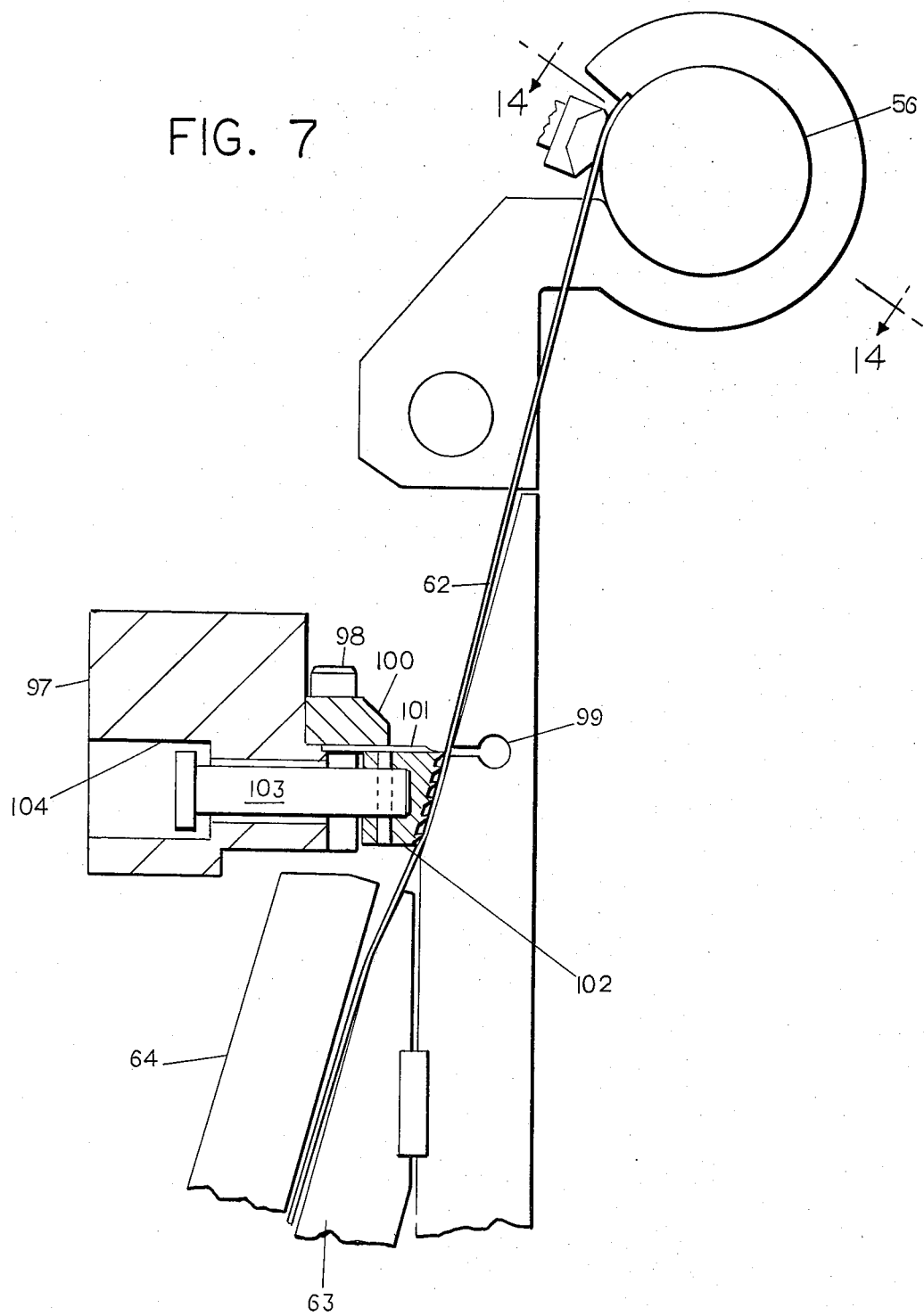
FIG. 7 is a plan view, part in section, looking down at the material severing mechanism, taken along lines 7—7 of FIG. 5.
Figure 8:
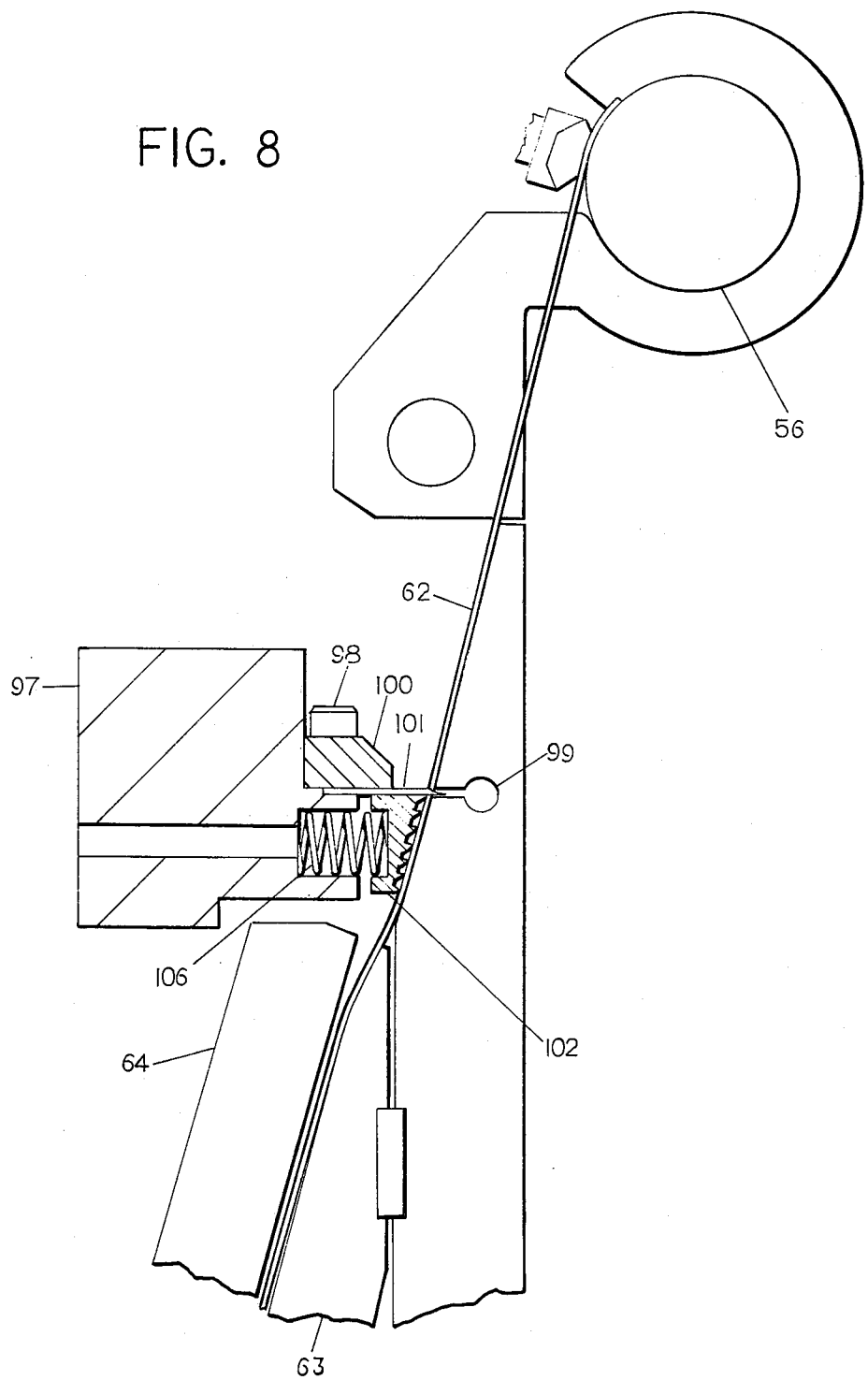
FIG. 8 is a plan view similar to FIG. 7 except that the knife is shown in the act of severing the foam sheet material.

FIG. 7 is a cross sectional view taken along the lines 7—7 of FIG. 5. Likewise, FIG. 8 is a cross sectional view similar to FIG. 7 and also taken along lines 7—7 of FIG. 5. Returning now to FIG. 7, the knife block is depicted by numeral 97 and rigidly attached thereto by fastener 98 and clamp block 100 is utilized to position knife 101. The knife block 97 and its rigidly attached knife 101 moves in a reciprocal motion toward and away from foam sheet material 62. On the side of foam sheet material 62 immediately opposite the leading edge of knife 101, is a reentrant or cut out portion 99, thus permitting the knife 101 to move freely into the support structure immediately opposite the knife block assembly 97. During the cutting sequence, the knife block 97 moves toward foam sheet material 62. The first portion of knife block assembly 97 to contact the foam sheet material 62 is the presser foot 102. The presser foot 102 is mounted on slide pin 103 which in turn is captivated within a cylindrical bore 104 located in knife block 97. The presser foot 102 is held in biased fashion against the surface of foam sheet material 62 by means of springs 105 and 106 which can best be seen in FIG. 6. The presser foot 102 stabilizes the foam sheet material 62 across its entire extent from top to bottom and assures that it is in firm engagement with the surface immediately adjacent to reentrant cut out portion 99.

FIG. 8, of course, shows knife 101 after it has completely severed foam sheet material 62. The tip of knife 101 has entered the reentrant portion 99 and the presser foot 102 remains firmly engaged against the surface of foam sheet material 62 while slide pin 103 is loosely engaged within cylindrical bore 104 as shown in FIG. 7. As the knife 101 is extricated from the cutting position, presser foot 102 remains in engagement with foam sheet material 62 until slide pin 103 reaches the terminal end of its extent of travel. The presser foot then moves in unison with knife block 97 and is pulled away from foam sheet material 62, thus permitting the grasping mechanism previously described in association with FIG. 5 to firmly grasp foam sheet material 62 and advance it toward mandrel 56.

Figure 9:
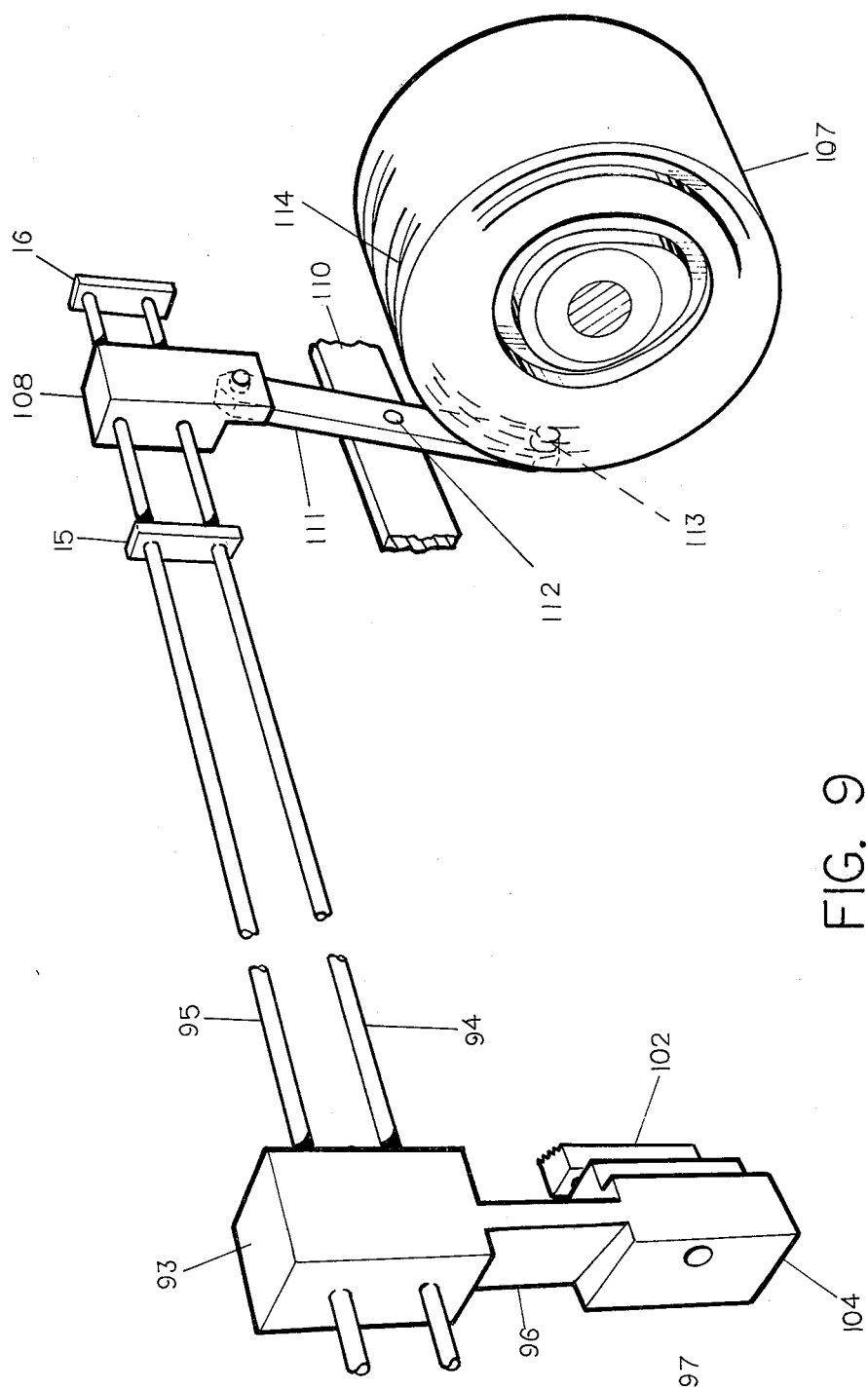
FIG. 9 is a perspective view, taken along lines 9—9 of FIG. 1, which shows the knife assembly and its cam actuated control mechanism.

The reciprocal motion of knife block 97 and its support rods 94 and 95 is controlled through the action of a cylindrical cam. Reference is now made to FIG. 2 and the five track cam wheel 107 which is directly coupled to the same shaft as is cam gear 46. The five track cam wheel 107 is also shown in the perspective view of FIG. 9. The support rods 94 and 95 are held in sliding engagement with rear plate 16 and intermediate plate 15. A push block 108 is attached firmly to rods 94 and 95 and is itself positioned between the plates 15 and 16. A structural support member 110 is attached in horizontal fashion between plate 15 and 16. The structural support 110 contains a pivot 112 to which is attached pivot bar 111. The top end of pivot bar 111 is movably attached to the lower extremity of push block 108. The lower extremity of pivot bar 111 contains a cam follower 113 which is adapted for engagement with cam track 114 of five track cam wheel 107. As five track cam wheel 107 rotates continuously and in unison with cam gear 46, the cam follower 113 will at the prescribed time move from front to rear, thus swinging pivot bar 111, which in turn causes the rods 94 and 95 to move in a horizontal direction, thus providing the moving power for the operation of support block 93 and the knife assembly attached thereto.

Figure 10:
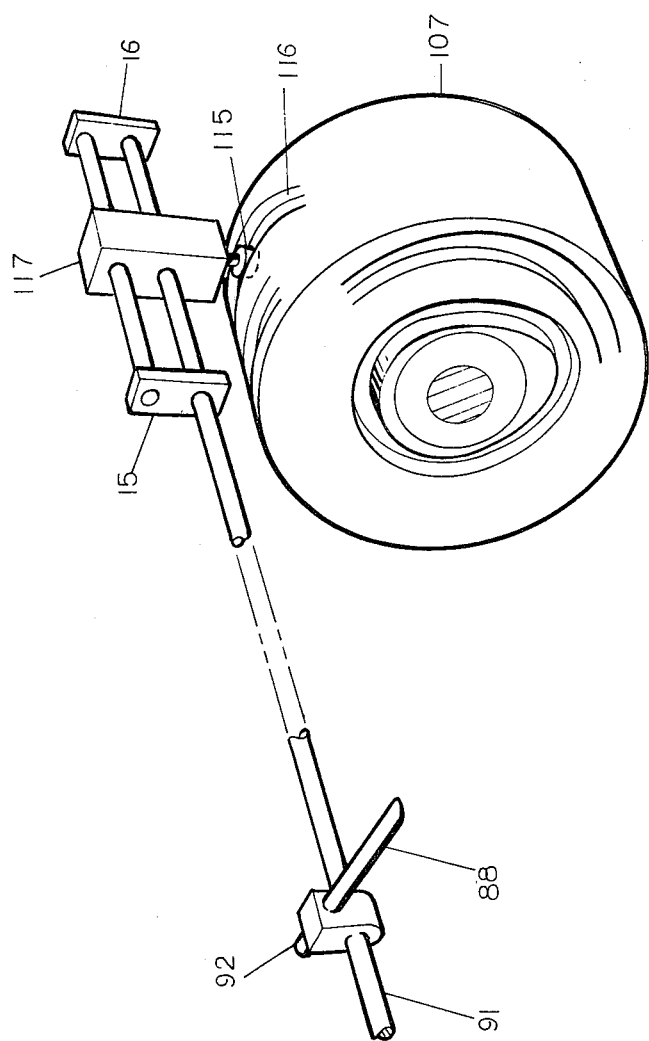
FIG. 10 is a perspective view, taken along lines 10—10 of FIG. 1, which shows the cam control for the operation of the material grasping fingers shown in FIG. 6.

FIG. 10 is a perspective view which also shows five track cam wheel 107. The five track cam wheel 107 is also used to actuate the grasping mechanism 65 which was previously shown and described in association with FIG. 5. The push rod 91, which is shown in FIG. 5, controls the rotational movement of toggel arm 86, as well as toggle arm 87. Push rod 91 is shown in FIG. 10 with its associated pawls 88 and 92. As cam gear 46, previously depicted in FIG. 2 rotates, five track cam wheel 107 also rotates synchronously therewith, thus causing cam follower 115 to move in cam track 116. The movement of cam follower 115 causes cam block 117 to reciprocate in a forward and backward direction. Since cam block 117 is rigidly attached to push rod 91, it in turn moves back and forth, thus causing the clamp fingers 73, 74 and small finger mechanism 77 to open and close at the proper time.

Figure 11:
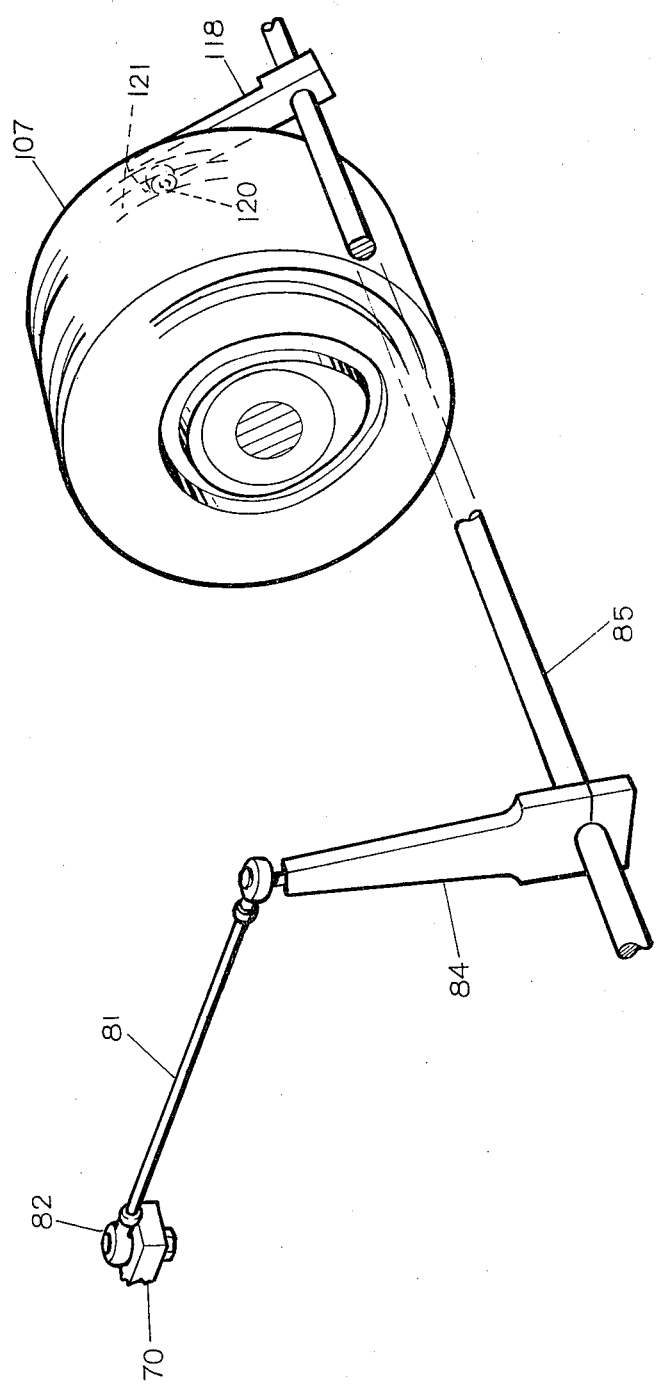
FIG. 11 is a perspective view, part in section, taken along lines 11—11 of FIG. 1 which shows the control mechanism for the movement of the material into the apparatus.

FIG. 11 is a perspective view of five track cam wheel 107. Once again, cam 107 is utilized to supply the synchronous motion necessary for the performance of the overall apparatus. Referring once more to FIG. 5, the actuating rod 85, its associated bell crank arm 84 and push rod 81 can be seen. This assembly in turn is attached to grasping mechanism 65 and supplies the reciprocating motion of this grasping mechanism 65 as it grasps foam sheet material 62 and advances it toward mandrel 56. The bell crank arm 84 and its associated parts are shown in FIG. 11. Actuating rod 85 is rigidly supported by the front, intermediate, and rear plates 17, 15 and 16 although this support is not shown in FIG. 11. As five track cam wheel 107 rotates, a cam follower 120 is engaged in a cam track 121 which has been milled in the back planar surface of five track cam wheel 107. The eccentric path of cam track 121 causes cam follower 120 and its associated arm 118 to rotate about the axis of actuating rod 85, thus causing actuating rod 85 to move first in a clockwise direction and then in a counterclockwise direction, thus providing the oscillatory motion for grasping mechanism 65.

Figure 12:
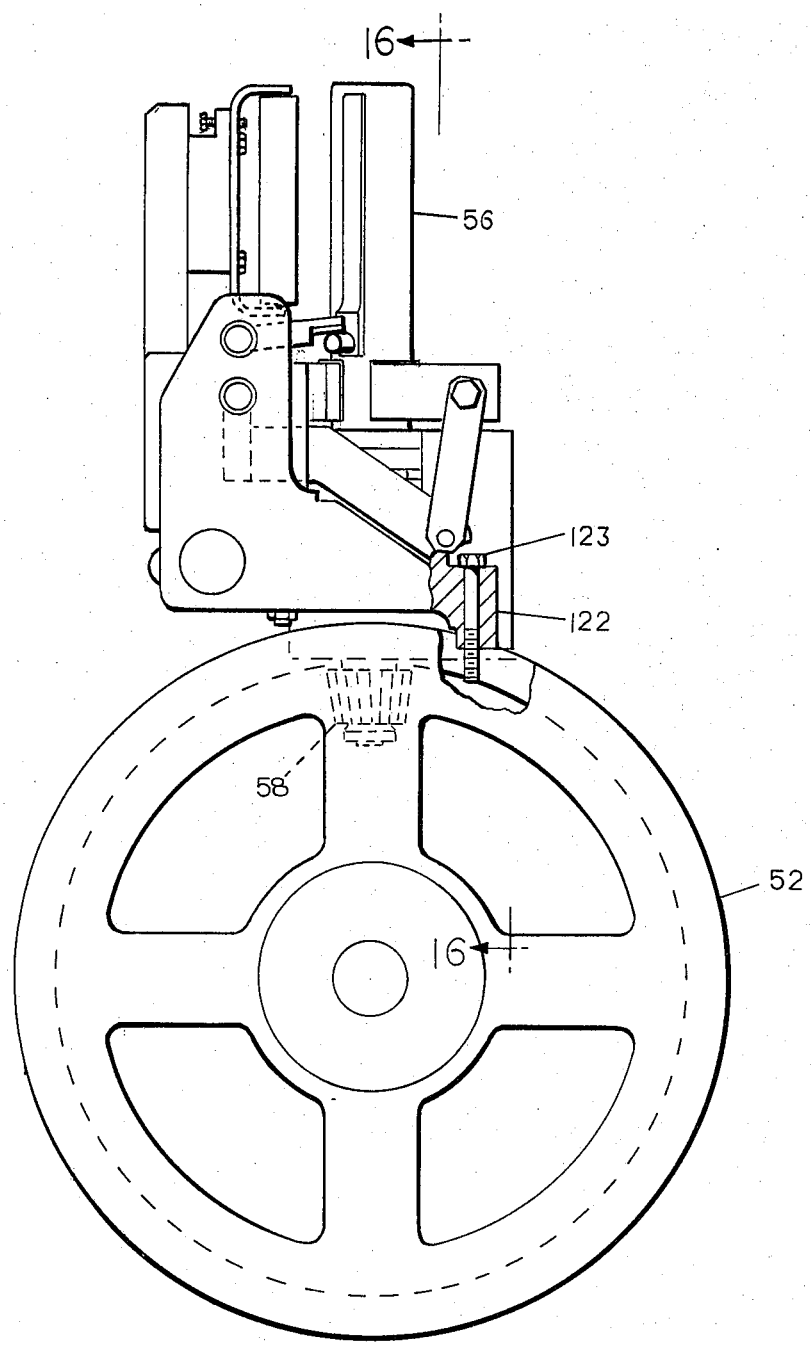
FIG. 12 is an elevational view, part in section, taken along lines 12—12 of FIG. 1, which shows the mandrel support casting mounted to the drum.

FIG. 12 is a front elevational view, part in section, looking toward the front end of drum assembly 52. The radially aligned mandrel 56 can be seen at the top of FIG. 12 and its associated pinion gear 58 is shown toward the bottom of the mandrel. The mandrel 56 and pinion gear 58 are mounted in a casting assembly 122 which in turn is rigidly mounted to the exterior of drum 52. While only one such assembly is shown in FIG. 12, there are eight identical assemblies in overall apparatus 10. The casting assembly 122 is bolted to drum assembly 52 by means of fasteners 123.

FIG. 13 is an elevational sectional view taken through the base portion of mandrel 56. The mandrel shaft 124 is journaled within casting assembly 122 by means of bearings 125 and 126. FIG. 13 also shows rod support lugs 127 which are an integral part of the casting assembly 122. The rods supported by this portion of the casting will be discussed later.

FIG. 14 is an elevational view, part in section, taken along lines 14—14 of FIG. 7. The mandrel 56 is of cylindrical configuration or other desired geometry and contains a sidewall 128. Sidewall 128 is adapted to receive the foam sheet material 62 which is wound in the form of a foam cylinder 130. A finger mechanism 133 is aligned axially with the exterior of mandrel 56. The finger mechanism 133 is designed and mounted so that it will swing away from the surface of mandrel 56 through an arcuate path until it reaches an extended position shown in dotted lines at 132. The finger mechanism 133 contains a cantilevered finger 131 which is rigidly attached to arm 134. Arm 134 is adapted for circular motion about fixed pin 135. An actuating lug 136 protrudes from and is in axial alignment with arm 134. The actuating lug 136 is the means for applying the force and causes finger mechanism 133 to rotate about pin 135. A force pin 137 is positioned within cylindrical bore 138 which in turn is located within and in axial alignment with the base of mandrel 56. The force pin 137 is biased toward arm 134 by means of compression spring 140. Thus in this fashion, finger mechanism 133 always carries its finger 131 in close proximity to the exterior of mandrel 56 except when acted upon by the driving force applied to actuating lug 136.

FIG. 14 also shows the vacuum line 141 which permits communication with cylindrical space 142. Space 142 permits a vacuum to be applied to apertures 143, thus holding the foam sheet material 62 and the foam cylinder 130 in position against mandrel 56.

Figure 15:
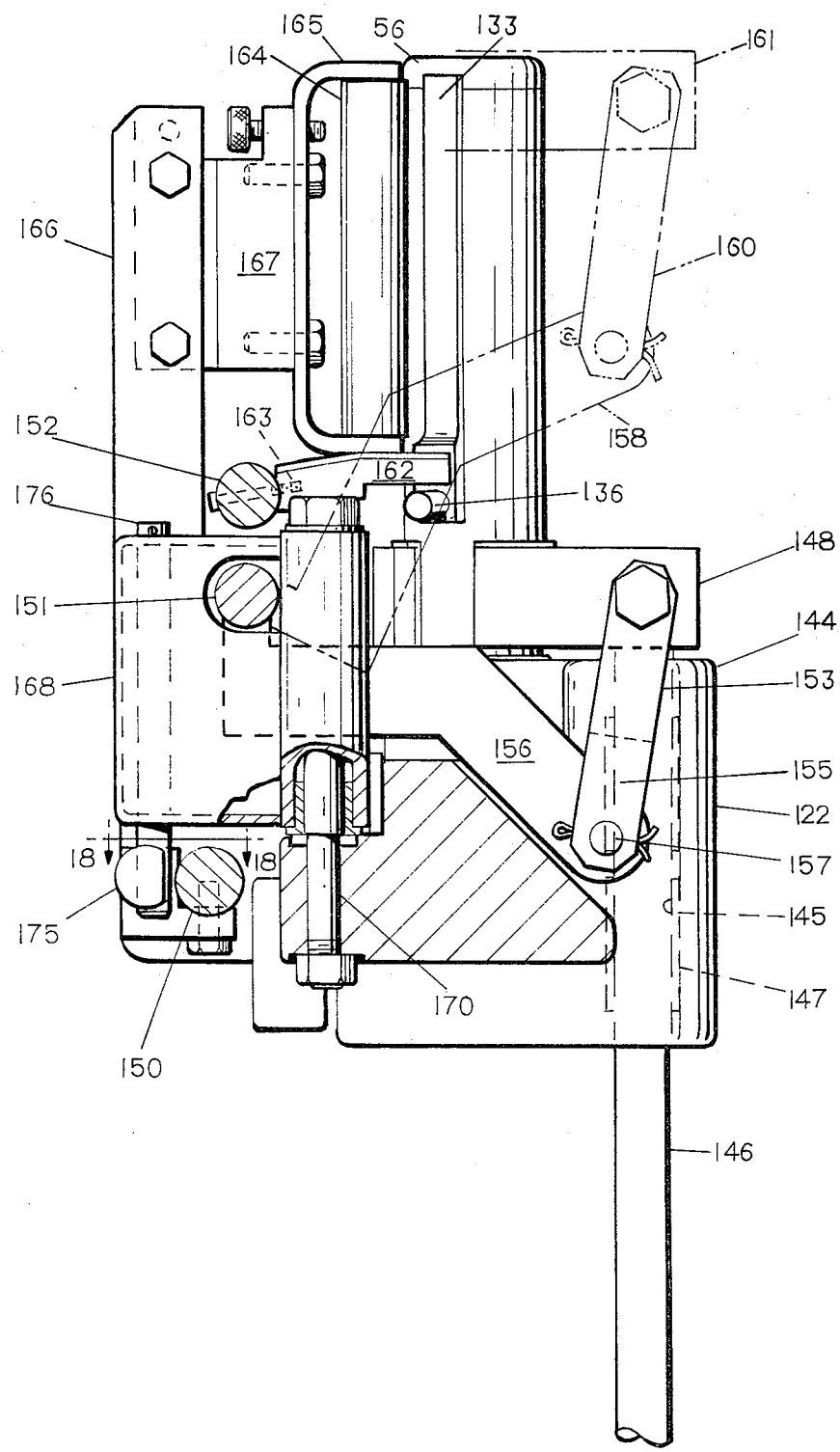
FIG. 15 is an elevational view, part in section, taken along lines 15—15 of FIG. 19 which shows the mandrel and its coacting mechanisms.
Figure 19:
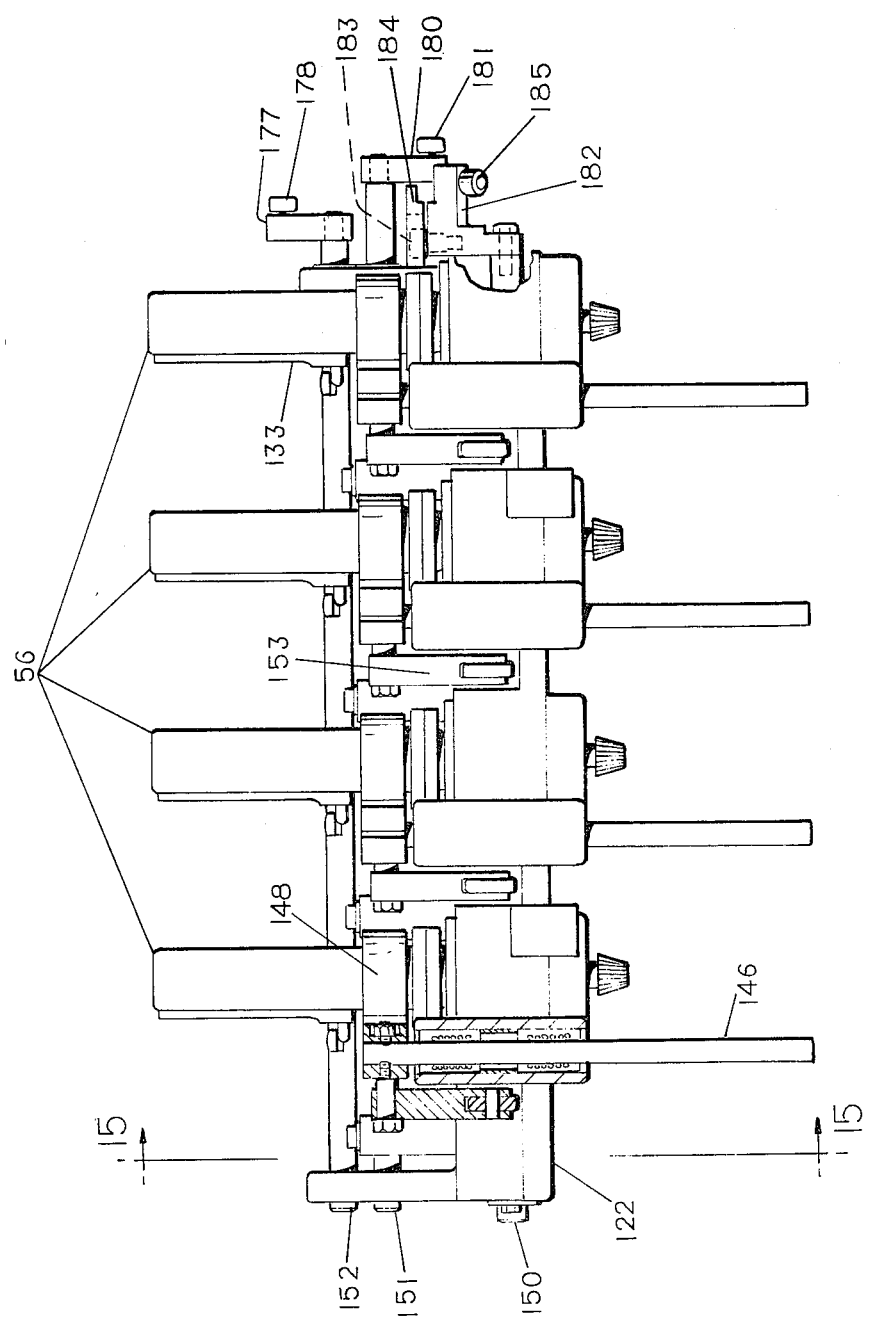
FIG. 19 is a side elevational view, part in section, which shows the mandrels, their support casting, and the cam rods for actuating the mechanism adjacent the mandrels.

Referring now to FIG. 15 which is an elevational view taken along the lines 15—15 of FIG. 19, this view is essentially one looking from the front of the drum assembly 52 toward its rear. The casting assembly 122, in addition to providing adequate support for mandrel 56, also contains boss 144 which in turn contains a vertically aligned cylindrical bore 145. A push rod 146 is positioned within cylindrical bore 145 and is mounted for sliding motion by means of bearings 147. The push rod 146 is free floating at its lower extremity and its upper end is firmly attached to ejection collar 148.

Figure 16:
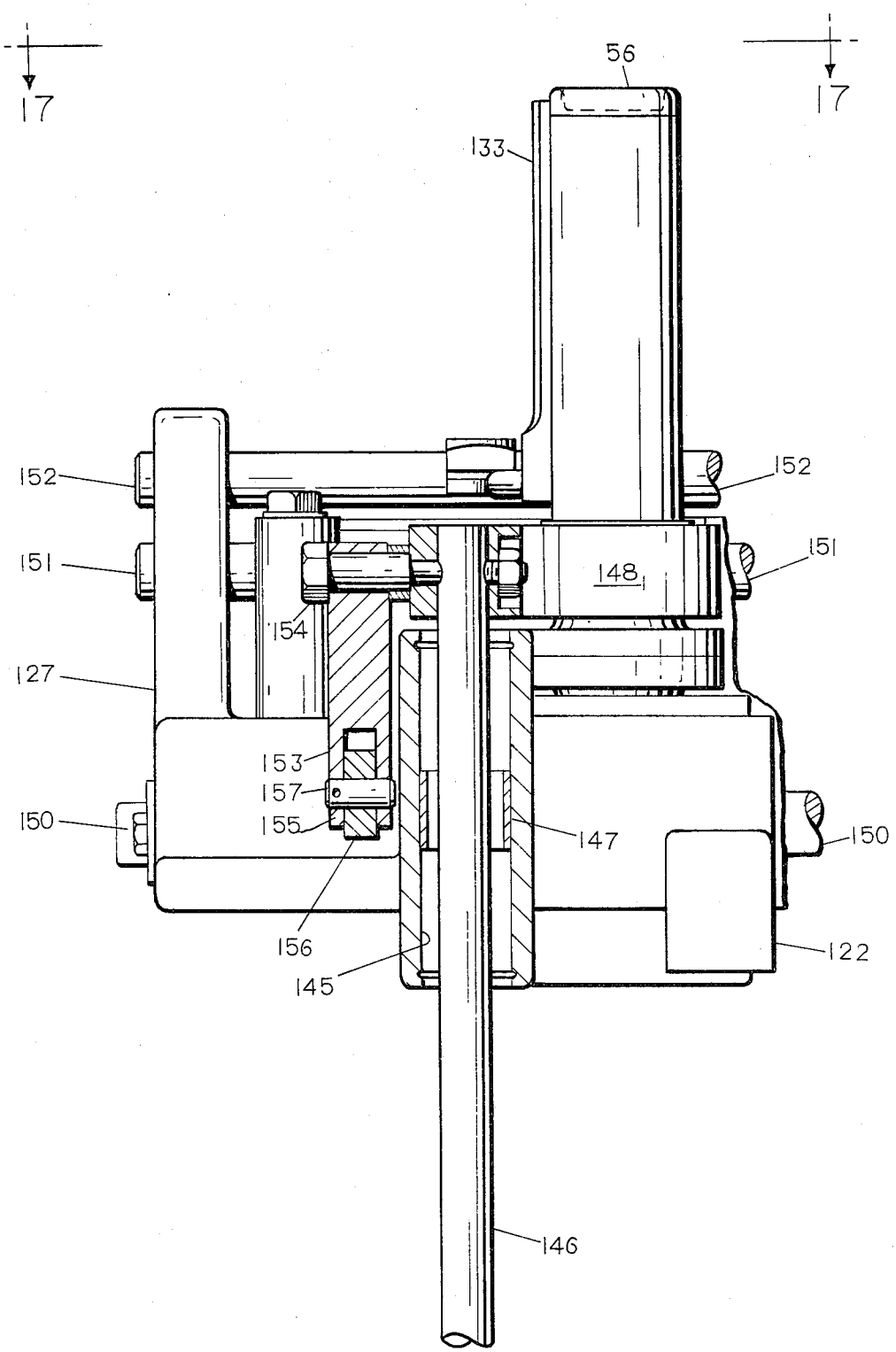
FIG. 16 is an elevational view, part in section, taken along lines 16—16 of FIG. 12.

FIG. 16 is an elevational view, part in section and taken along lines 16—16 of FIG. 12, which shows a view at right angles with respect to FIG. 15. FIG. 16 shows also push rod 150 which will be described more fully hereinafter. Lower torque rod 151 is journaled within the rod support lugs 127 of casting assembly 122. The lower torque rod 151 controls the movement of ejection collar 148. Also shown, is upper torque rod 152 which is journaled in rod support lugs 127. The upper torque rod 152 controls the opening and closing of finger mechanism 133.

Figure 17:
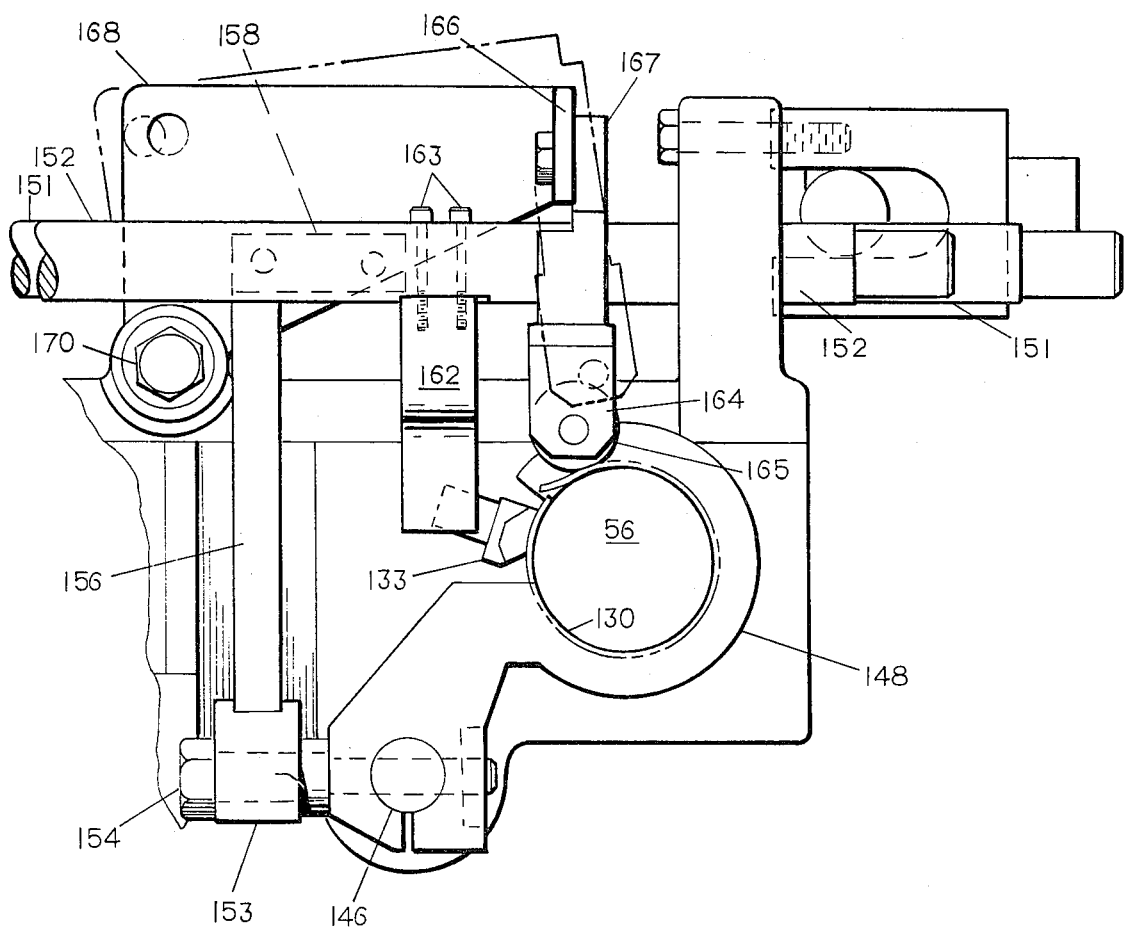
FIG. 17 is a plan view taken along lines 17—17 of FIG. 16 which shows the mandrel and its associated roller.

FIG. 17 is a plan view taken along lines 17—17 of FIG. 16 looking down upon the mandrel 56 and its associated parts as shown in FIG. 16, as well as FIG. 15. FIG. 17 shows the ejection collar 148 and how it nearly circumscribes the entire cylindrical extent of mandrel 56. The ejection collar 148 maintains a clearance within its circumferential extent for finger 131 so that it may have freedom to move toward and radially outward from mandrel 56. The ejection collar 148 is attached to the top of push rod 146. A linkage bar 153 is attached to ejection collar 148 by means of fastener 154. The lower end of linkage bar 153 is bifurcated at 155 in order that swing arm 156 may be pivotally attached thereto by means of fastener 157. Swing arm 156 is attached to lower torque rod 151 as shown in FIG. 17 at numeral 158. The attachment 158 is made by means of fasteners anchored into milled surfaces on lower torque rod 151. As lower torque rod 151 rotates, swing arm 156 moves in a counterclockwise direction and is capable of assuming the position shown in broken lines in FIG. 15 at 158. Linkage bar 153 likewise assumes an upper position 160 and ejection collar 148 moves to the upper extent near the end of mandrel 56 as shown at 161. The amount of rotation that can be applied to lower torque rod 151 is controlled from station to station, thus permitting ejection collar 148 to be raised to an intermediate position along the axial extent of mandrel 56, or on the other hand, the ejection collar 148 can be raised across the entire axial extent of mandrel 56.

The actuating lug 136 associated with finger mechanism 133 can be seen in FIG. 15. As previously described, a biasing force on actuating lug 136 causes finger 131 to move toward and away from the surface of mandrel 56. The biasing force delivered to actuating lug 136 is controlled by finger arm 162 which is rigidly cantilevered from upper torque rod 152. The fasteners 163 can be seen in FIGS. 15 and 17. The upper torque rod 152 periodically rotates in a clockwise direction as viewed in FIG. 15, thus causing finger arm 162 to depress actuating lug 136 which in turn causes finger 131 to move in an arcuate direction away from mandrel 56 and its associated foam cylinder 130.

Referring once again to FIG. 15, a roller 164 is shown adjacent to and in parallel alignment with mandrel 56. The roller 164 is mounted in a yoke arm 165 which is attached to post 166 by means of mounting block 167. The post 166 is rigidly mounted to swing member 168. Swing member 168 pivots about fastener 170 which is anchored to the casting assembly 122.

Figure 18:
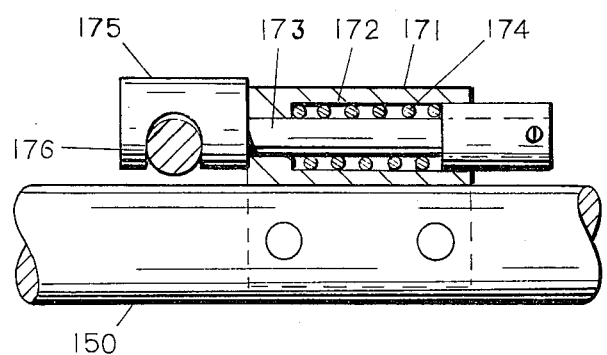
FIG. 18 is a plan view, part in section, taken along lines 18—18 of FIG. 15 which shows the dampening mechanism for the roller shown in FIGS. 15 and 17.

FIG. 18 is a plan view, part in section, taken along lines 18—18 of FIG. 15. Push rod 150 is shown at the bottom of the figure and attached thereto is shock absorbing block 171. Shock absorbing block 171 contains a central bore 172. A rod 173 is positioned within central bore 172 and is surrounded by a compression spring 174. Rod 173 contains an enlarged end 175 that coacts with pin 176. The pin 176 is vertically oriented and passes through swing member 168 as shown in FIG. 15. As push rod 150 is moved back and forth, the pin 176 which is yieldingly attached thereto, causes swing member 168 to move in an arcuate path about fastener 170. The rotary motion of swing member 168 permits roller 164 to move into and out of engagement with the external surface of mandrel 56 and the foam cylinder 130 contained thereon. The compression spring 174 and its association with rod 173 permits push rod 150 to move through its entire programmed axial extent even though roller 64 for some reason or another cannot make its prescribed movement in the vicinity of mandrel 56. This feature is not only for the safety of the operator working with the overall apparatus 10, but also it prevents misalignment or breaking of the apparatus in what can be considered a critical area.

FIG. 19 is a side elevational view, part in section, which shows the mandrels, their support casting, and the cam rods for actuating the mechanism adjacent the mandrel. This figure shows the entire complement of four mandrels 56 in line from the front to the rear of the casting assembly 122 which in turn is anchored to the exterior of drum assembly 52 previously shown in FIGS. 4 and 12. Attention is now directed to the extreme right hand portion of FIG. 19. A crank arm 177 is shown attached to upper torque rod 152. A cam follower 178 is attached to the free end of crank arm 177 as shown in the drawing. A crank arm 180 is rigidly affixed to the end of lower torque rod 151. A cam follower 181 is likewise attached to the free end of crank arm 180. Push rod 150 contains a fitment 182 rigidly attached thereto. The fitment 182 contains two cam followers. The first cam follower 183 is mounted in a vertical direction from fitment 182. Cam follower 183 is adapted for back and forth movement within a slot milled in bar 184 which is attached to the end of casting assembly 122. Cam follower 183 permits push rod 150 to oscillate back and forth without any rotation taking place. A second cam follower 185 is attached to fitment 182 and actually supplies the motion associated with push rod 150. The cam followers 185, 183 and 181 and their interaction with the cam drives will be explained more in detail infra.

Figure 20:
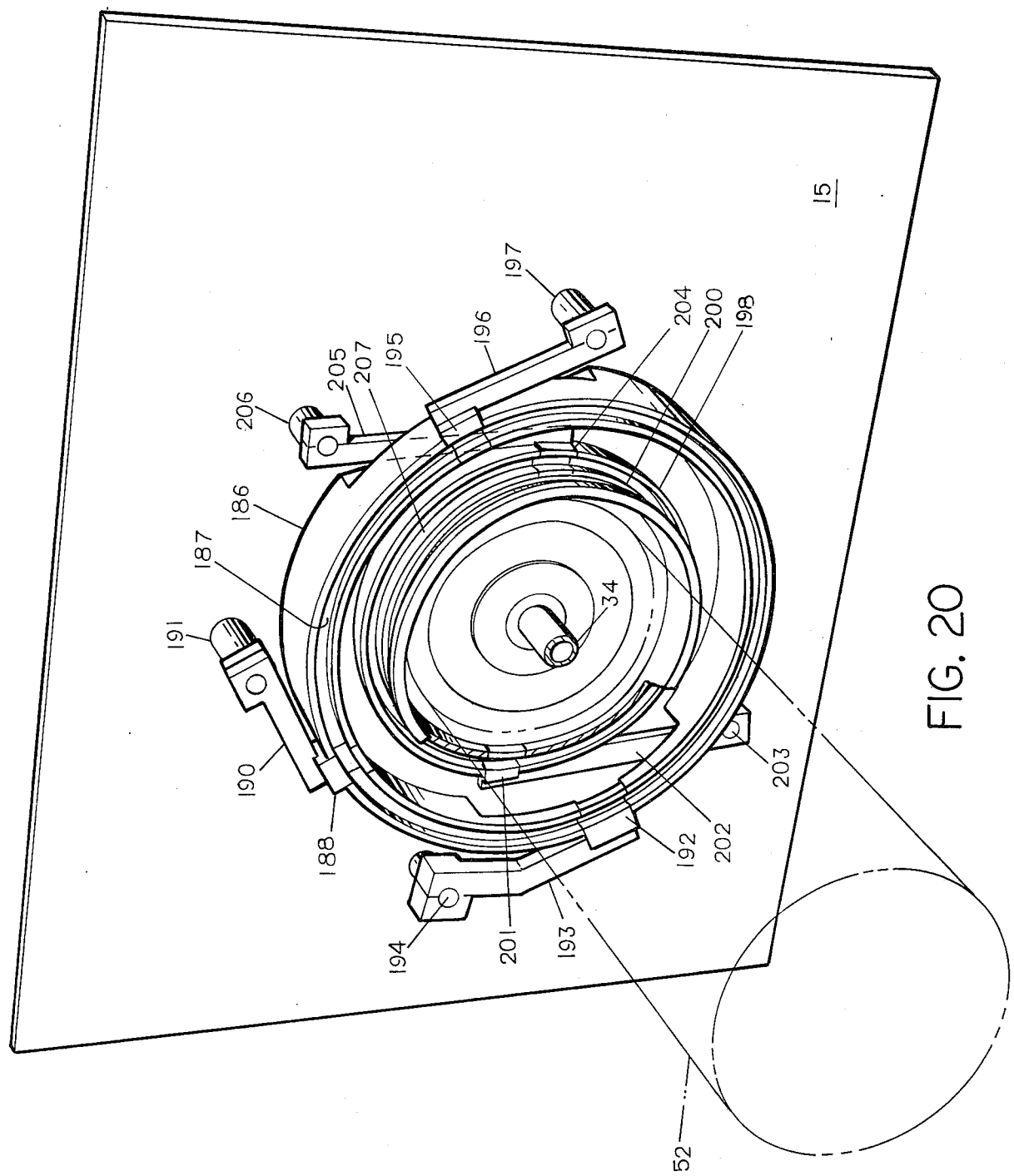
FIG. 20 is a perspective view, part of which is in section and phantom lines, showing the drum location and the cam tracks associated with the finger and roller controls.

FIG. 20 is a perspective view looking toward the front surface of intermediate plate 15. The position of drum assembly 52 is shown in phantom lines. The stationary shaft 34 is shown part in section although it ultimately continues for the full extent of drum assembly 52. A cylindrically shaped cam track cylinder 186 is positioned in concentric relationship with respect to shaft 34. The cam track cylinder 186 is attached to intermediate plate 15 by fasteners not shown. The cam track cylinder 186 contains a cam groove 187 milled into the end surface most remote from intermediate plate 15. The cam groove 187 is of uniform depth and also is concentric in configuration. The cam follower that coacts therewith receives no directional movement from cam groove 187. Cam groove 187 merely acts as a stabilizer and positioner for the cam follower.

Referring once again to FIG. 19, the right hand side of this figure shows cam follower 178 which is coupled to upper torque rod 152. This particular rod controls the opening and closing of finger mechanism 133. The cam follower 178 coacts with the cam groove 187 which is shown in FIG. 20. This interaction between cam follower 178 and groove 187 can be seen in cross section at the top of FIG. 4. FIG. 20 shows three movable cam track sections associated with cam track cylinder 187. The first movable cam track section 188 is attached to the end of arm 190. The arm 190 in turn is affixed to the end of shaft 191. The second cam track section 192 is attached to the end of arm 193, which in turn is attached to the end of drive shaft 194. The third cam track section 195 is attached in a similar manner to arm 196 which is likewise attached to drive shaft 197.

During the operation of the overall apparatus 10, when cam follower 178 reaches the vicinity of cam track section 188, it is moved out of the normal path of groove 187, thus causing upper torque rod 152 to rotate. After a brief rotation in one direction, the cam follower 178 for the upper torque rod 152 is then returned to its normal position and can continue onward in an arcuate path controlled by groove 187 until the cam follower 178 reaches the second cam track section 192. Once again, the cam track follower 178 is translated radially upward from its normal path or groove 187. Once again, the upper torque rod 152 rotates and cause the finger mechanism 133 to open. Thus it becomes evident at three specific locations the upper torque rod 152 is actuated. The specific locations with respect to the overall sequence of the apparatus 10 will be discussed later.

FIG. 20 shows a second cam track cylinder 198 positioned inboard of cam track cylinder 186. This second, or inner cam track cylinder 198, is attached to the front surface of intermediate plate 15 by fasteners not shown. The cam track cylinder 198 has positioned on its cantilevered or front end, a groove 200. The groove 200 is concentric with the centrally positioned shaft 34 and groove 200 does not vary in depth, thus the cam follower 181 maintains a constant relative position as it traverses the circumferential extent of groove 200. The cam follower 181 can be seen at the right hand side of FIG. 19 and in cross section at the top of FIG. 4. The cam follower 181 is attached by means of crank arm 180 to lower torque rod 151 which in turn controls the ejection collar mechanism 148. As cam follower 181 traverses its circular path in groove 200, it contacts cam track section 201 which can be removed from groove 200, thus causing lower torque rod 151 to rotate. The cam follower 181 is then returned to groove 200. The cam track section 201 is attached to arm 202 which is affixed to the end of drive shaft 203. The motion of drive shaft 203 will be discussed later. As cam follower 181 continues to traverse the arcuate extent of groove 200, it encounters a second cam track section 204. The cam track section 204 is attached to arm 205 which is affixed to the end of shaft 206. Shaft 206 likewise will be discussed later. Thus we see cam track section 201 causes lower torque rod 151 to rotate a certain amount controlled specifically by the amount cam track section 201 is moved radially outboard from groove 200. In this instance, cam track section 201 moves a small amount. The cam track section 204 in contrast moves a larger amount, thus causing lower torque rod 151 to rotate through a greater number of degrees. This greater amount of rotation causes the ejection collar 148 to move the entire extent of mandrel 56, thus causing the foam cylinder 130 to be ejected from mandrel 56.

The cam track cylinder 198, which is positioned concentrically within cam track cylinder 186, contains an additional cam groove 207 which is positioned in the outside cylindrical surface thereof. The cam groove 207 contains cam follower 185 which is shown at the right hand side of FIG. 19. Cam follower 185 is attached to push rod 150. The cam groove 207, while of constant depth, does vary in the extent of its distance from the front surface of intermediate plate 15. As cam follower 185 is drawn toward the surface of intermediate plate 15, it causes push rod 150 to actuate the roller 164, thus causing it to move into and out of engagement with the exterior surface of mandrel 56 and the foam cylinder 130 contained thereon.

Figure 21:
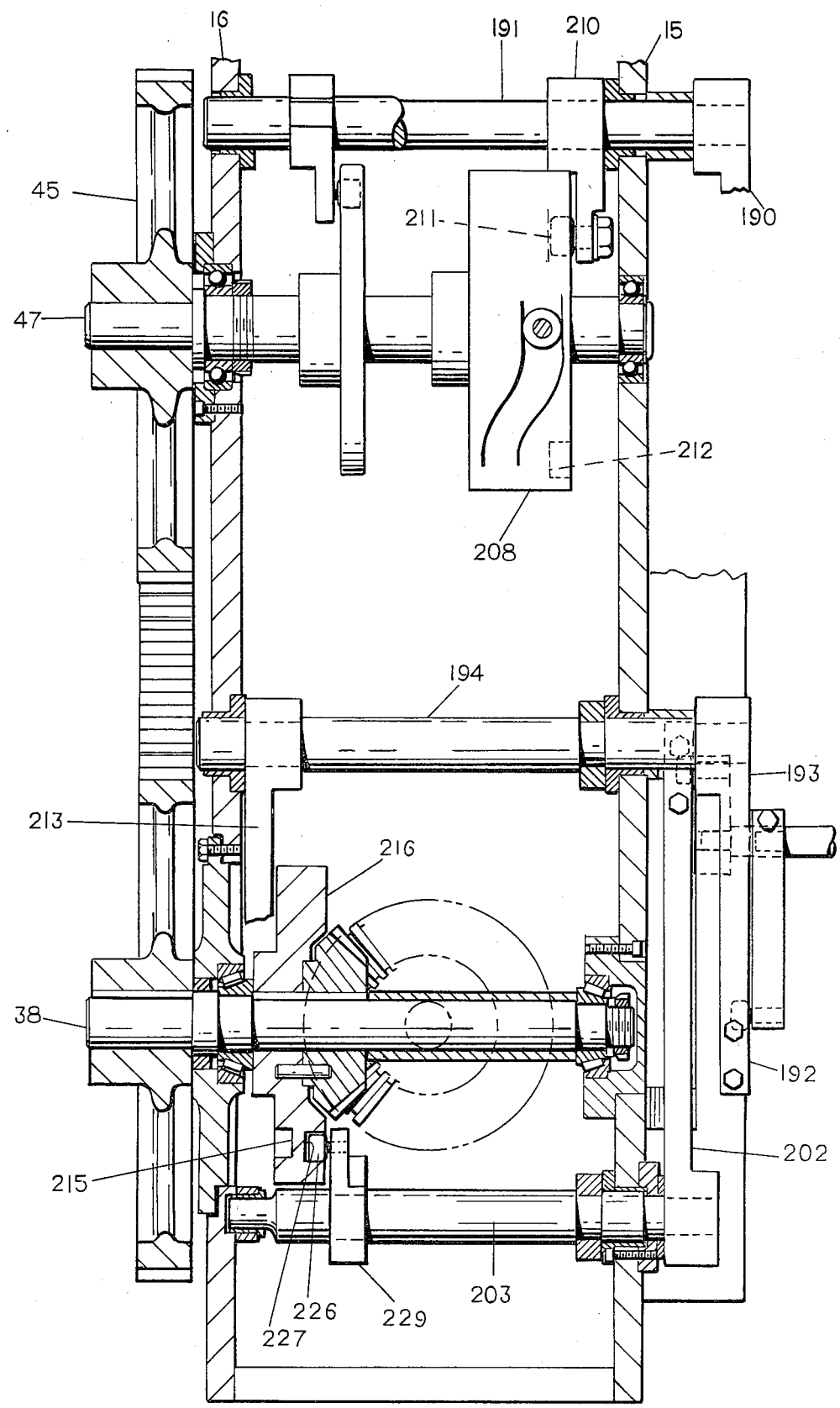
FIG. 21 is an elevational view, part in section, taken generally along the lines 21—21 of FIG. 2; the front of the apparatus is at the right of the figure.

FIG. 21 is a part in section elevational view taken along lines 21—21 of FIG. 2. The intermediate plate 15 is shown on the right hand side of FIG. 21 and rear plate 16 is shown on the left hand side. At the top left side of FIG. 21 is cam gear 45 and its associated shaft 47. This arrangement, of course, can be seen also in FIGS. 2 and 3. As shaft 47 traverses the distance between intermediate plate 15 and rear plate 16, there are two cam wheels mounted thereon. The larger cam wheel is designated as numeral 208. Shaft 191 is shown at the top of FIG. 21. Shaft 191 is coupled at its right hand end with arm 190. Arm 190 is shown in FIG. 20 along with its cam track section 188. In FIG. 21, shaft 191 is shown coupled to cam follower arm 210. Cam follower arm 210 is cantilevered in a direction toward and behind cam wheel 208. Cam follower 211 coacts with cam groove 212 (FIG. 2).

When the cam follower 211 reaches that portion of cam groove 212 where there is a deviation from a concentric path, the arm 191 is caused to rotate, thus causing arm 190 to lift cam track section 188 away from the groove 187. This, in turn, as previously described, causes the finger mechanism 133 to open.

Figure 24:
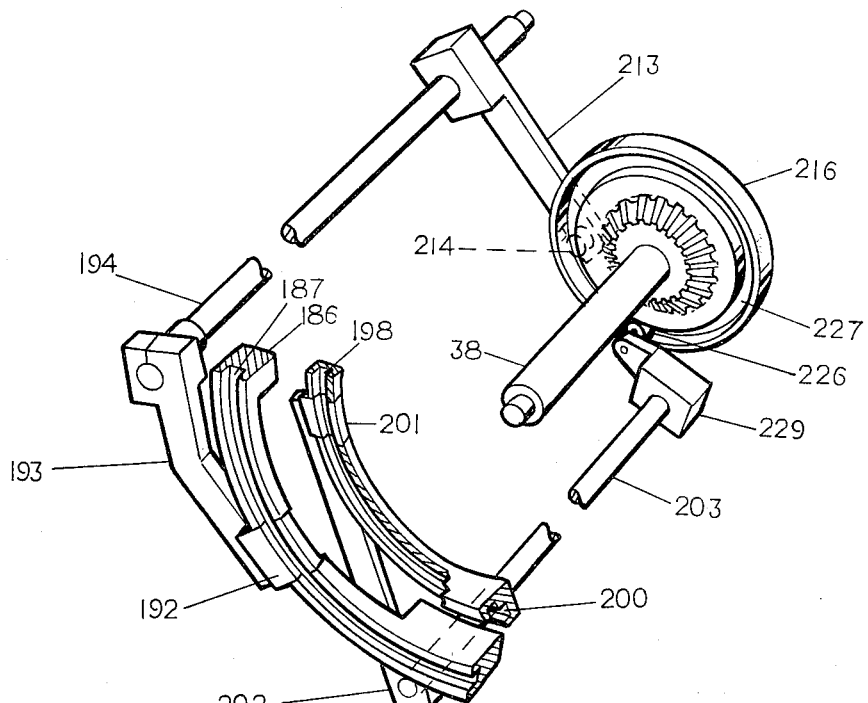
FIG. 24 is a perspective view, part in section, which shows the cam wheel shown in the lower left of FIG. 2 and also portions of the cam tracks shown in FIG. 20.

The shaft 194, associated arm 193 and cam track section 192, as shown in FIG. 20, are also shown in FIG. 21. The shaft 194 is connected to cam follower arm 213 which in turn has at its cantilevered end cam follower 214 which coacts with groove 215 in cam wheel 216 (FIG. 24). The cam wheel 216 is affixed to drive shaft 38 as shown in FIGS. 21 and 2. As cam wheel 216 revolves under the influence of drive shaft 38, the cam follower 214 will, at the proper time, cause arm 213 to rotate, thus in turn, torquing shaft 194. Rotation of shaft 194 causes arm 193 to likewise rotate, thus pulling cam track section 192 out of its normal engagement with cam track cylinder 186. As the cam track section 192 moves radially outboard, the finger mechanism 133 is once again actuated, causing finger 131 to move away from close proximity with the surface of mandrel 56.

Figure 22:
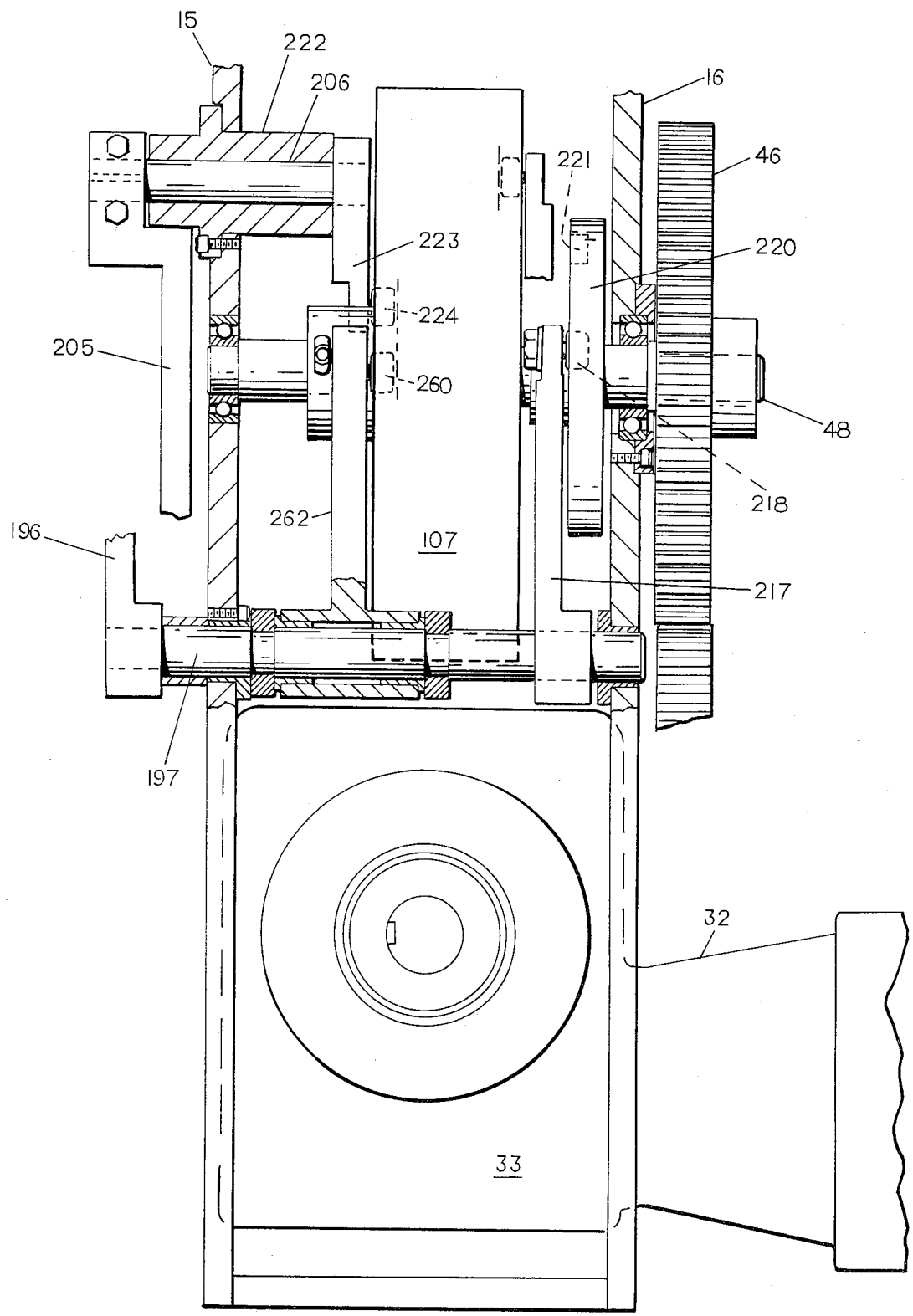
FIG. 22 is an elevational view, part in section, taken looking along the lines 22—22 of FIG. 2; the front of the apparatus is at the left of the figure.

The third cam track section 195 as shown in FIG. 20, its associated arm 196 and torque shaft 197, are also shown in FIG. 22. FIG. 22 is an elevational view, part in section, taken along the lines 22—22 of FIG. 2 with the back of the overall assembly 12 to the right hand side. Shaft 197 is journaled in intermediate plate 15 and rear plate 16 as shown. A cam follower arm 217 is attached to the right side of shaft 197. The end of cam follower arm 217 contains cam follower 218 which interacts with cam groove 221 in cam wheel 220. The cam wheel 220 is rigidly affixed to shaft 48 which is powered by gear 46.

Figure 23:
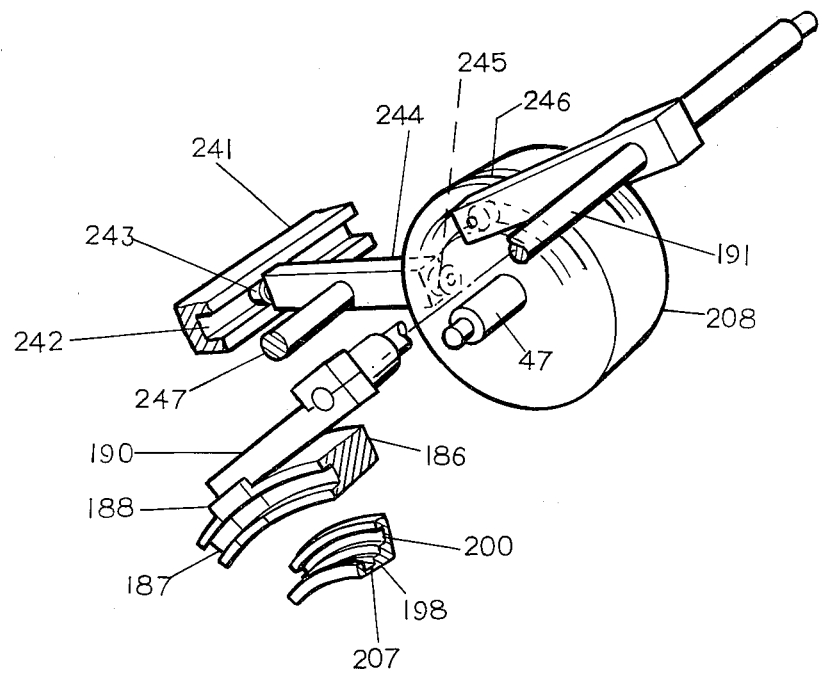
FIG. 23 is a perspective view, part in section, which shows the cam wheel depicted in the upper left of FIG. 2 and a portion of the cam tracks shown in FIG. 20.

FIG. 23 is a perspective view of cam wheel 208. The cam track section 188, as well as a broken away portion of cam track cylinder 186, is shown in perspective. This view augments that which is shown in FIG. 20. FIG. 24 is also a broken away perspective view which shows cam wheel 216 and its associated cam followers. The cam follower 214, associated arm 213 and coacting shaft 194 are shown. It is through this linkage that cam track section 192 is moved out of engagement with cam track cylinder 186. This motion also causes the finger mechanism 133 to operate in the heretofore described manner.

Referring now to FIG. 20, the inner cam track cylinder 198 contains two cam track sections 201 and 204 which control the movement of ejection collar 148. The first cam track section 201 and its associated linkage will now be described. Referring now to FIG. 21, the shaft 203 can be seen at the bottom of the figure. A cam arm 202 is fixed to shaft 203. A cam arm 229 is attached to shaft 203. A cam follower 226 rides in a cam groove 227 which is positioned in the front face of cam wheel 216. The cam follower 226 is attached to the end of cam arm 229. As cam follower 226 causes shaft 203 to rotate, the ensuing motion causes cam track section 201 to deviate from its normal position in the circular layout of inner cam track cylinder 198. This motion causes ejection collar 148 to move partially along the axial extent of mandrel 56, thus causing foam cylinder 130 to cantilever slightly over the end of mandrel 56. In this manner, the end of foam cylinder 130 can be heat softened for further working.

FIG. 24 shows in perspective shaft 203 and the cam arm 229 attached thereto. The cam follower 226 can be seen in position within groove 227 of cam wheel 216.

Referring now to the top of FIG. 22, the shaft 206 can be seen journaled within sleeve mechanism 222 which is anchored to intermediate plate 15. Shaft 206, of course, can be seen also in FIG. 20 because it supplies the moving force which permits cam track section 204 to deviate from its normal position within the confinement of inner cam track cylinder 198. The shaft 206 is connected to cam arm 223 and cam arm 223 contains on its outermost extremity, cam follower 224 which tracks in groove 225 (as best seen in FIG. 2) of cam wheel 107. The movement afforded by cam follower 224 causes shaft 206 to rotate, thus permitting arm 205 to move cam track section 204 out of its normal position within cam track cylinder 198. The cam track section 204 moves a greater distance in a radial sense than does cam track section 201, thus the net effect is that ejection collar 148 will move a far greater distance until it assumes a position 161 as shown in FIG. 15. As the ejection collar 148 moves to this extreme position, the foam cylinder 130 is ejected from the mandrel 56.

As the overall drum 52 revolves in a counterclockwise direction as looking upon it from the front, the second station counterclockwise 45 degrees from top dead center, is the point in time when the mandrel has completed its first revolution about its own longitudinal axis and the foam cylinder 130 is in a position for sealing. Heat is supplied not only to the edges of the severed foam sheet material, but heat is also supplied to the faces of the foam sheet stock prior to its severance by knife block 97 and knife 101. To effect the proper distribution of heat to the heat seal area of station 2, a heat on-off device is utilized.

Figure 25:
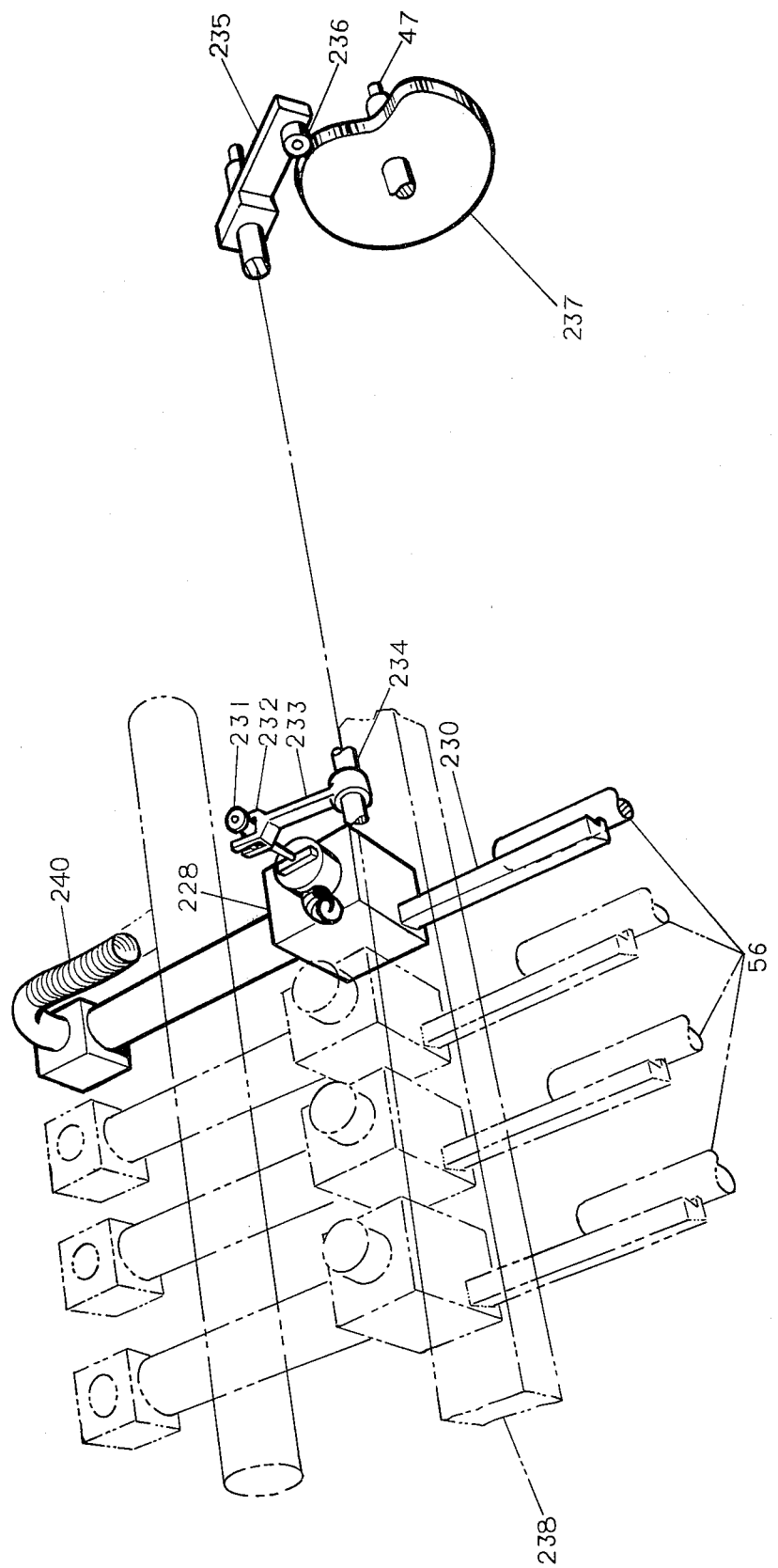
FIG. 25 is a perspective view looking down toward the mandrels when they are positioned at the station immediately following the winding of a sleeve around the mandrel.

FIG. 25 is a perspective view showing the mechanism for controlling the distribution of heat. A plenum chamber is shown at 228. A valve mechanism is contained therein which directs heat toward heat dispensing nozzle 230. The valving mechanism within plenum chamber 228 is controlled by reciprocating push rod 231. The push rod 231 is actuated by the bifurcated end 232 of lever arm 233. Lever arm 233 is anchored to torque rod 234 which is mounted for rotation in the vertical front intermediate and rear plates 17, 15 and 16. A cam arm 235 is attached to torque rod 234. Cam arm 235 and its associated cam follower 236 is positioned so that cam follower 236 can ride the peripheral surface of cam disc 237. Cam disc 237 can be seen in FIG. 2 attached to shaft 47 which is powered by gear 45. In this manner, heated air is directed to the seam area of the foam cylinder 130 as it is positioned ready for sealing.

Also shown in FIG. 25 is the support member 238 which also is mounted to and between front plate 17 and intermediate plate 15. A heat source 240 is introduced to the top portion of plenum chamber 228.

Referring now to FIG. 23, the cam wheel 208 is shown in perspective. To the left of cam wheel 208 is a stationary horizontally aligned stabilizing cam track 241. The cam track 241 contains a cam groove 242 and a cam follower 243 which is positioned on one end of bar 244. The other end of bar 244 also contains a cam follower attached thereto identified as numeral 245. The cam follower 245 tracks in groove 246 of cam wheel 208. The bar 244 is attached to push rod 247.

Figure 26:
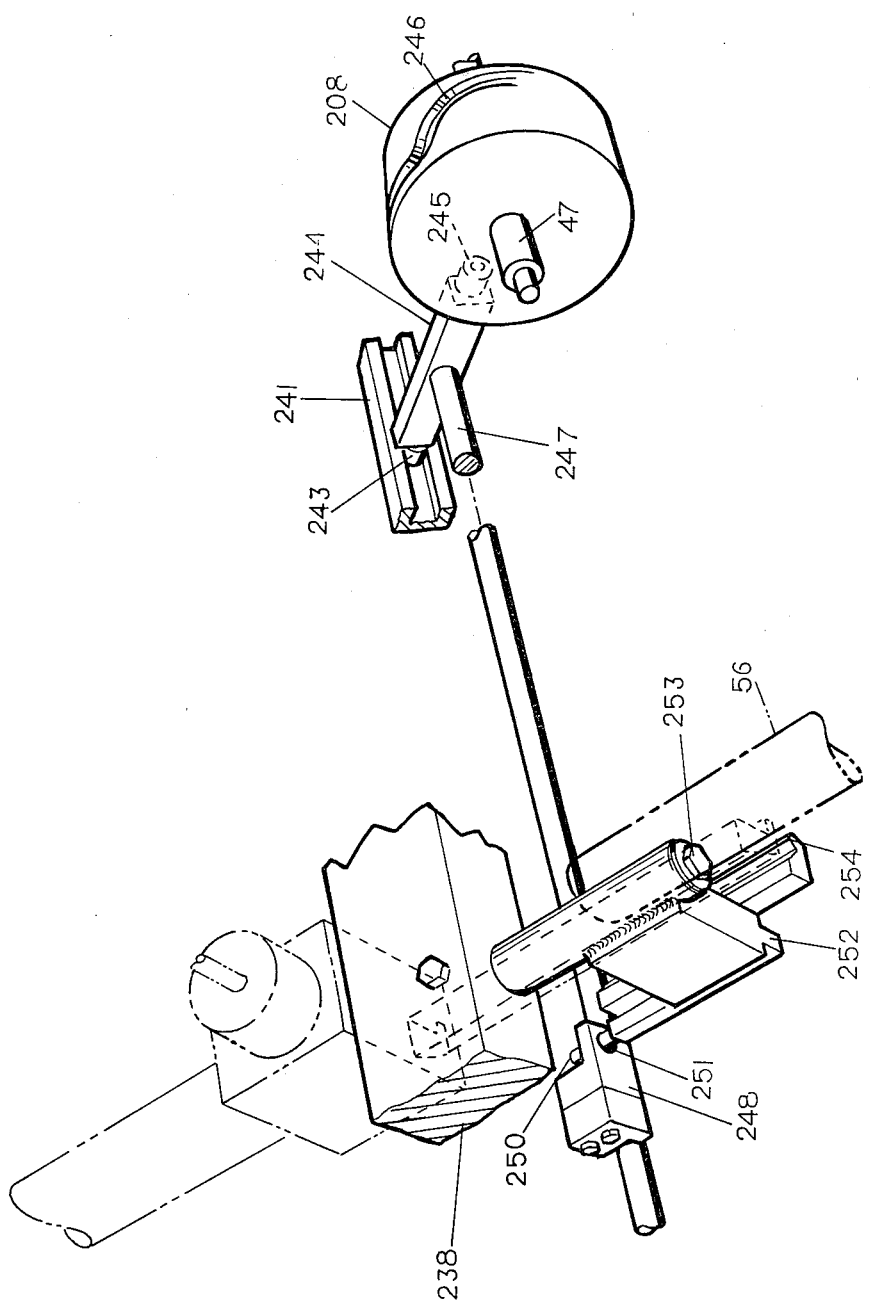
FIG. 26 is a perspective view similar to that shown in FIG. 25 except that the mechanism for actuating the seal bar assembly is shown.

The previously discussed assembly can also be seen in FIG. 26 which is a perspective view showing the push rod 247 and the mechanism it controls. A clamp bar 248 is attached to push rod 247. A pin 250 coacts with an aperture 251 which is positioned in clamp bar 248. As push rod 247 moves back and forth along its axial extent, its movement through pin 250 causes the heat clamp bar assembly 252 to pivot about pivot support 253. As the seal bar assembly 252 rotates, its tip 254 comes in contact with the previously heated edges of foam cylinder 130.

Figure 27:
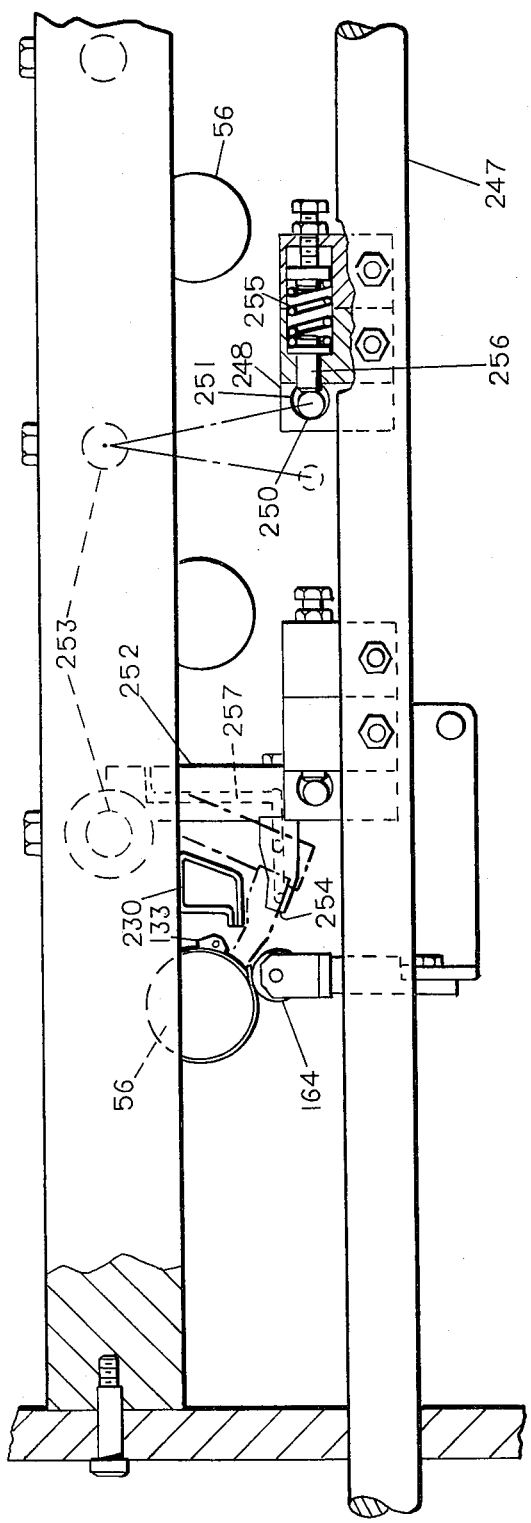
FIG. 27 is a view, part in section, looking axially toward the mandrels when they are at the station immediately following the winding of a sleeve around the mandrel.

FIG. 27 is a broken away sectional view looking radially inwardly along the axial line of mandrels 56 while they are positioned at station 2, or 45 degrees counterclockwise from the topmost mandrel position. As the previously discussed push rod 247 is moved back and forth, the clamp bar 248 coacts with pin 250. A pawl 256 rides against pin 250 and is biased from the other end by means of spring 255. In this manner, the mechanism will not be destroyed if perchance a foreign object comes between the tip 254 of the seal bar assembly 252 and the mandrel 56. The seal bar assembly 252 is cored with a series of bores 257 in order that a cooling medium may be circulated therethrough to hold the tip 254 at a constant temperature below which the foam sheet material of foam cylinder 130 will not stick. Also shown in FIG. 27 is the heat dispensing nozzle 230 which originates from plenum chamber 228. The heat nozzle 230 directs a gaseous medium toward the spliced joint of foam cylinder 130. The finger 131 can be seen in position against the leading edge of the foam sheet stock. Also, the roller 164 can be seen in contact against the exterior surface of the foam sheet stock. Between finger 131 and roller 164, the foam sheet stock is held in close proximity to the exterior of mandrel 56. After the tip 254 of seal bar assembly 252 forms the side seal of the cylinder, the roller 164 and the finger 131 can be backed off without any adverse affect to foam cylinder 130. The finger 131 is kept in contact with the exterior of the foam cylinder to assure that it does not shift or fall off the mandrel 56 while the mandrel is rotating about its own axis and circumscribing a path under the influence of the rotating drum 52 to which it is attached.

Figure 28:
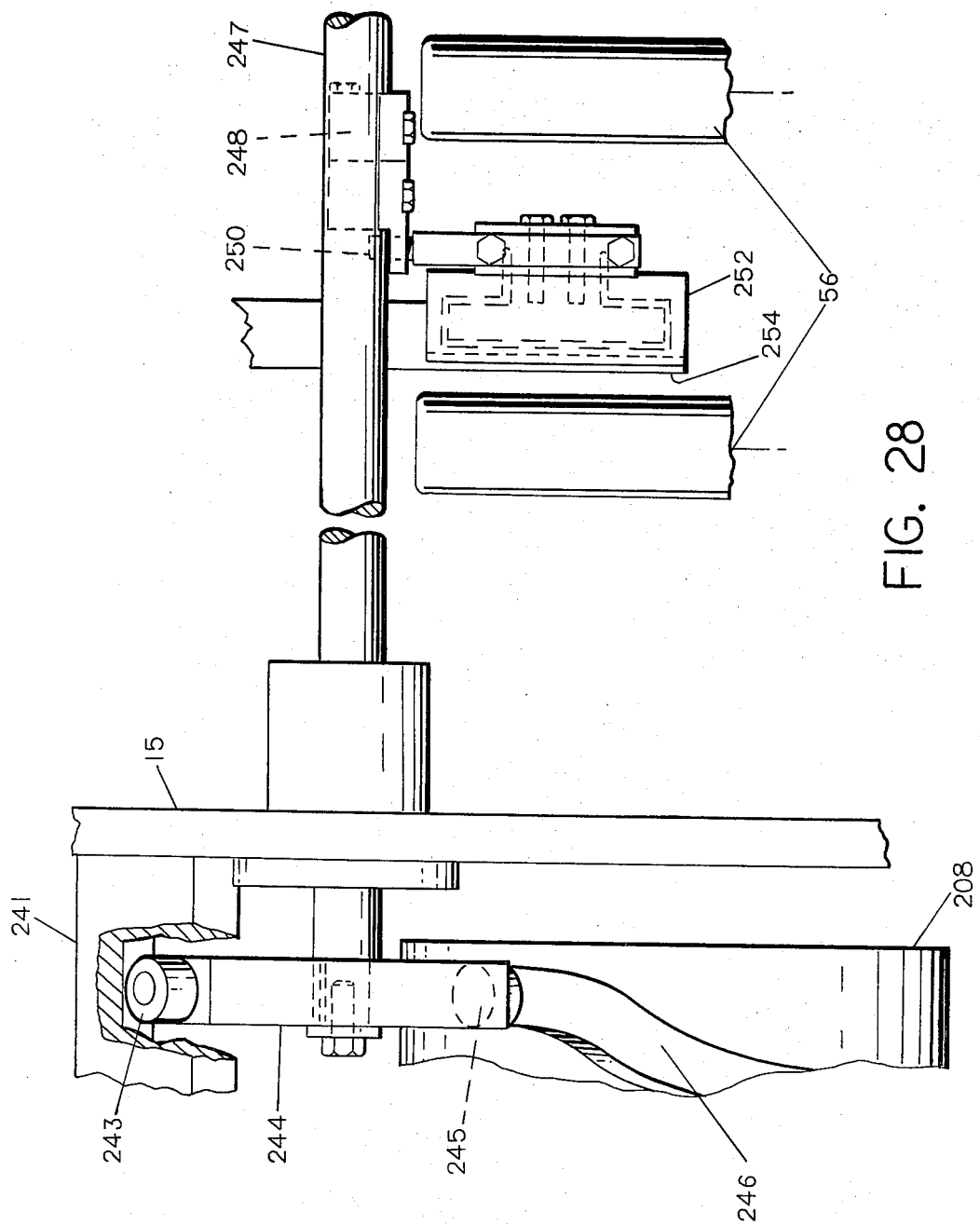
FIG. 28 is a view, part in section, looking up toward the mandrels when the mandrels are at the station where the heat seal bar assembly is activated. This station is the same as the station shown in FIGS. 25, 26 and 27.

FIG. 28 is a broken away sectional view looking in an upward direction toward the side of mandrel 56 when it is at station 2 or 45 degrees counterclockwise from top dead center. The push rod 247 and its clamp bar 248 are shown toward the right hand side of FIG. 28. The seal bar assembly 252 can be seen in true form from top to bottom and also shown in dotted lines therein are the cores for the cooling medium which circulate therein to keep the tip 254 at the desired temperature for the particular material that is being fed into overall apparatus 10. Also shown in this view is the cam track 246 of cam wheel 208. The bar 244 and the cam followers 243 and 245 positioned at respective ends of bar 244 are also shown.

Figure 29:
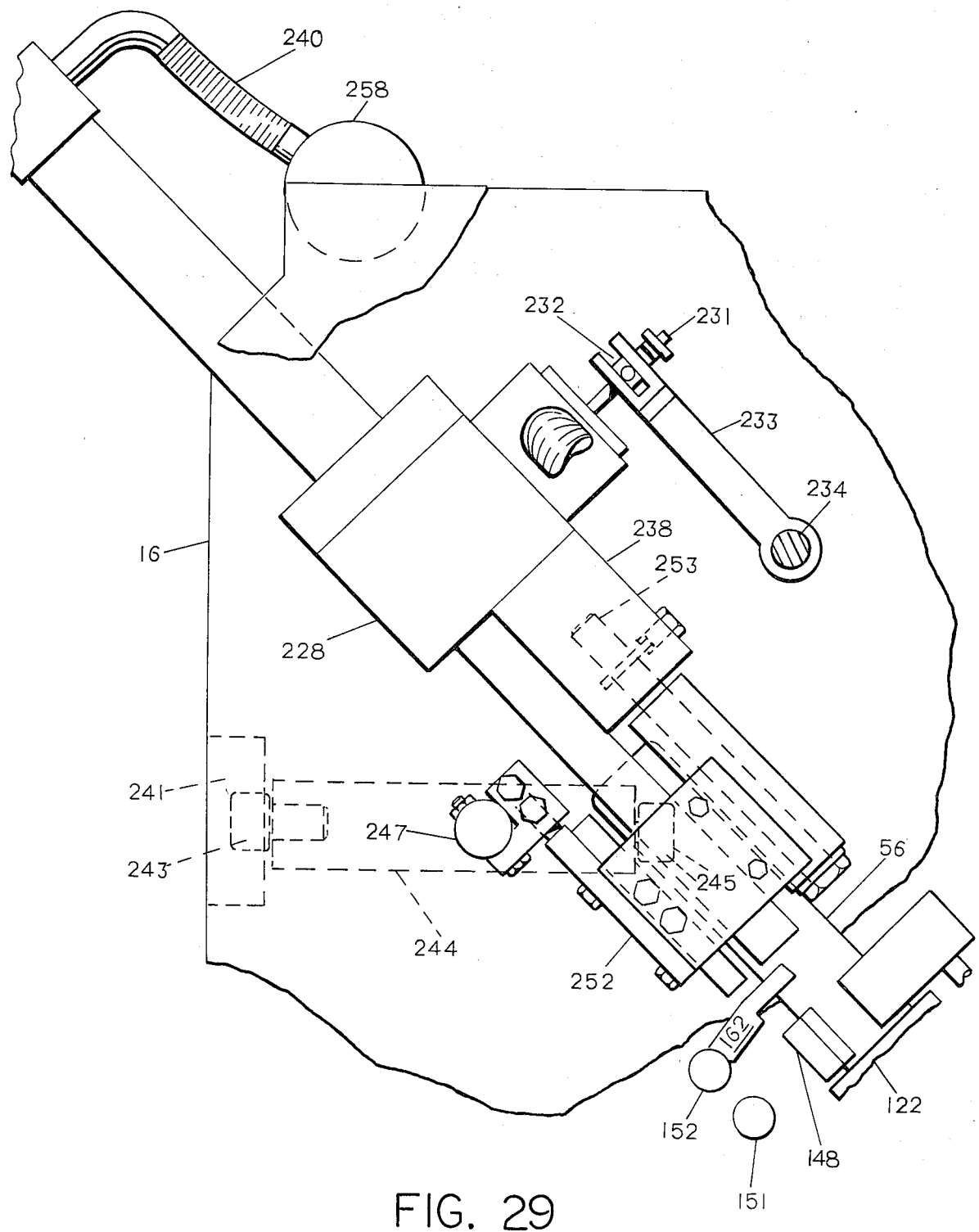
FIG. 29 is an elevational view, part in section, taken looking in the direction of lines 29—29 of FIG. 1, which shows the heat seal bar and the mandrel, including the heat distribution system.

FIG. 29 is an elevational view, part in section, looking toward the drum 52, and particularly at station 2, where the mandrel pauses upon the completion of the winding of foam cylinder 130. The mandrel 156 is shown at an attitude of 45 degrees with respect to the vertical. This is at the lower right hand side of FIG. 29. The ejection collar 148 can be seen at the bottom of mandrel 56. Likewise, the lower torque rod 151 and upper torque rod 152 are shown. The seal bar assembly 252 is shown in its true side view. The seal bar assembly 252, of course, rotates about pivot 253 which is anchored in support member 238. The push rod 247 and its attached bar 244 are also shown along with the cam followers 243, 245. The plenum chamber 228 is shown in its side view along with the air ingress 240 which originates from common air source header 258.

While most of the mechanical functions associated with mandrels 56 are carried by the drum assembly 52, the seal bar assembly 252 is stationary in that it is activated each time mandrel 56 moves into the station 2 position.

After the foam cylinder 130 has been sealed along its side by heat bar assembly 252 and tip 254, the mandrel then rotates through position 3 and onto position 4. Position 4 is 135 degrees counterclockwise from top dead center. At osition number 4 the ejection collar 48 is caused to move partially along the extent of mandrel 56, thus causing foam cylinder 130 to protrude slightly over the end of mandrel 56. Heat may be applied to the end of cylinder 130 at this station if desired. The foam cylinder in this particular attitude is then carried by means of mandrel 56 to station number 5 which is 180 degrees opposite top dead center. At station number 5 and also station number 6, heat is also applied to the cantilevered free end of foam cylinder 130. Because of the orientation which is an inherent part of the particular foam sheet stock material used with apparatus 10, the end of cylinder 130 is shrunk to a smaller diameter under the influence of heat. The heat softened foam cylinder 130 is then moved to station 7 which is 270 degrees counterclockwise from top dead center.

Figure 30:
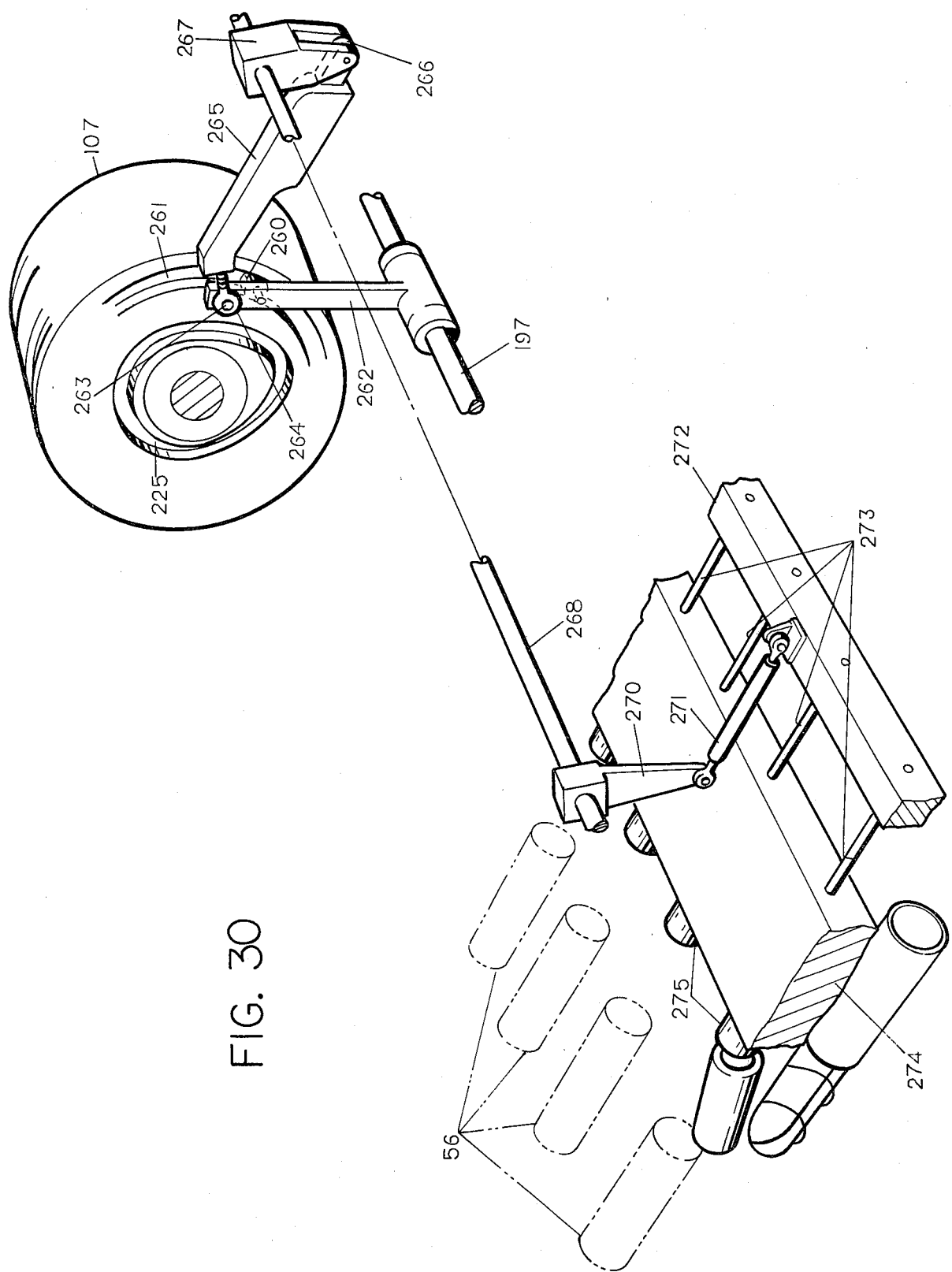
FIG. 30 is a perspective view, part in section, looking toward the mandrels when they are at the station where the completed sleeves are ejected therefrom. The cam wheel positioned in the upper right hand view of FIG. 2 is also shown.

FIG. 30 is a perspective view, part in section, which shows 5 track cam wheel 107 at the top of the figure. A cam follower 260 is positioned in groove 261 of cam wheel 107. The cam follower 260 is attached to crank arm 262. The crank arm 262 is pivoted about shaft 197. This particular shaft 197 and crank arm 262 can also be seen in the elevational view of FIG. 22. A pin 263 is attached to crank arm 262 outboard of the position where cam follower 260 is attached. An eyebolt arrangement 264 coacts with pin 263 and is attached to the end of link bar 265. The opposite end of link bar 265 is pivotally attached to the bifurcated end 266 of arm 267. The arm 267 is in turn rigidly attached to torque shaft 268. The torque shaft 268 is mounted for rotational movement in plates 15, 16 and 17. The left hand end of torque shaft 268, as viewed in FIG. 30, is attached to arm 270. The cantilevered end of arm 270 is pivotally connected to adjustable link bar 271. The opposite end of adjustable link bar 271 is attached to a yoke 272. The yoke 272 is coupled with actuator rods 273. The actuator rods pass through appropriate bearings not shown in structural member 274. The structural member 274 is anchored to the vertical intermediate plate 15 and front plate 17. The actuator rods 273 contain compression and piercing dies attached to their end. The piercing dies are identified by numeral 275.

Figure 31:
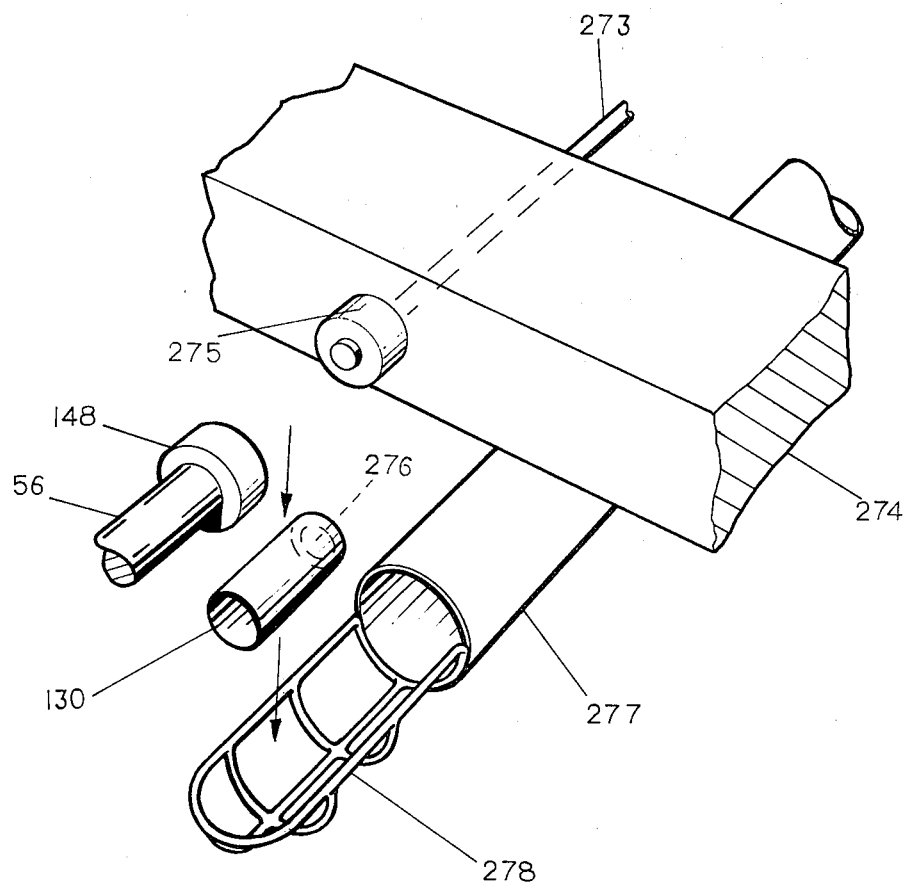
FIG. 31 is a perspective view, part in section, looking toward the sleeve bottom forming die and the mechanism for carrying the completed sleeves away from the apparatus.

FIG. 31 is a perspective view, part in section, which shows the piercing die 275 in the fully retracted position and the ejection collar 148 in its fully extended position at the free end of mandrel 56. The completed foam cylinder 130, including the small orifice 276, has been discharged from the mandrel and is in the process of being picked up by basket 278 which is attached to pneumatic tube 277. The foam cylinder can then be transported to storage at a location remote from the overall apparatus 10.

Referring once again to FIG. 31, it can be seen that the foam cylinder 130 falls into a retaining basket 278 just prior to its ingress into pneumatic tube 277.

Figure 32:
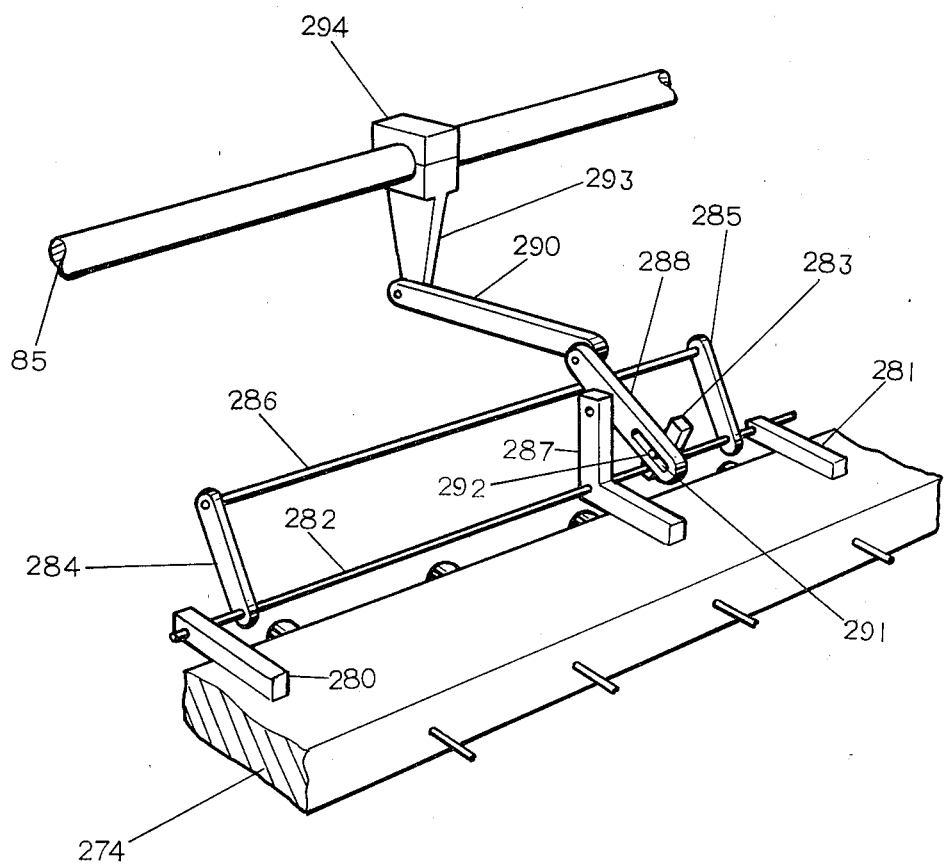
FIG. 32 is a perspective view, part in section, looking toward the takeout station similar to FIG. 30 which shows the mechanism for disengaging the completed sleeves from the bottom forming dies.

In most instances, the foam sleeve 130 will fall into receiving basket 278 once it has been completed, however, there is the possibility that some foam cylinders 130 will adhere to the piercing die 275 and not fall freely into basket 278. In order to provide for a positive of disengagement of foam cylinder 130 from piercing die 275, the mechanism shown in FIG. 32 has been devised. FIG. 32, of course, shows structural member 274 which is in a horizontal attitude. A rod support bracket 280 is attached to one end of the top surface of structural member 274. A similar rod support bracket 281 is attached at the other top surface of structural member 274. A support rod 282 is mounted within apertures on the ends of rod support brackets 280 and 281. Thus support rod 282 can rotate freely even though it is held in position by means of rod support brackets 280 and 281. A pivot arm 283 is rigidly attached to support rod 282 and is cantilevered in an upward direction therefrom. Support arms 284 and 285 are also rigidly attached to support rod 282. A push bar 286 is attached to and suspended between the ends of arms 284 and 285. A support bracket 287 is also attached to the top surface of structural member 274 and is positioned between rod support brackets 280 and 281. The support rod 282 passes through an aperture in support bracket 287. An apertured linkage bar 288 is pivotally mounted on the top cantilevered end of support bracket 287. The upper end of apertured linkage bar 288 is in turn movably attached to connecting bar 290. The apertured linkage bar 288 contains an elongated slot 291 on its lower end. A slide pin 292 is rigidly attached to pivot arm 283 and is engaged in elongated slot 291. The end of connecting bar 290 most remote from apertured linkage bar 288 is in turn pivotally attached to crank arm 293. The crank arm 293 is rigidly affixed to a clamp block 294 which is rigidly affixed to shaft 85.

As shaft 85 oscillates in an arcuate path around its longitudinal axis, the crank arm 293 also moves through an arcuate path. By means of connecting bar 290 and apertured linkage bar 288, the push bar 286 swings up and down in synchronization with the remainder of the machinery. For example, as the completed foam cylinders 130 are about to be ejected, the push bar 286 is rapidly lowered, thus disengaging any foam cylinders which may have attached themselves to the end forming dies. The push bar 286 then rapidly retracts itself in an upward direction so that it does not interfere with the next actuation of the end dies.

In the operation of the overall apparatus and the method of fabricating containers thereon, the foam sheet material is stored on large cylindrical rollers which are mounted adjacent to the apparatus shown in FIG. 1, although the rolls of material are standard and need not be shown for the purposes of the present invention. The foam sheet material 62 is fed into the apparatus and is preheated so that it will become more flexible and can be tailored to the mandrels of apparatus 10. The foam sheet material is grasped by the grasping mechanism 65. The grasping mechanism attaches itself to the top edge of the foam sheet material 62 and advances it forward to a position where the leading edge of the foam sheet material 62 lies adjacent to the surface of the mandrel 56. At this time the finger mechanism 133 is in the open position with the finger 131 moved away from the surface of mandrel 56. The finger 131 is then positioned against the leading edge of the foam sheet material 62. The knife lock 97 then moves toward the surface of the foam sheet stock and the presser foot 102 moves against the surface of the foam sheet material 62. Shortly thereafter the knife 101 severs the foam sheet material and the drum is ready to index from top dead center or station 1 in a counterclockwise direction to station 2 which is 45 degrees in arcuate displacement therefrom. As the mandrel begins to move in its circular path along with the drum, the mandrel begins to spin about its own axis under the influence of pinion gear 58 and stationary gear 60. At this time the finger mechanism 133 closes and grasps the free edge of the now severed foam blank material. The mandrel rotates a few degrees and the roller 164 moves into position behind the already closed finger and keeps the foam sheet material in close contact with the mandrel surface as the mandrel rotates. The mandrel continues its arcuate path along with the drum until it reaches station 2. At this time the mandrel has rotated about its own axis so that the foam sheet material is completely wound on the mandrel and the trailing edge of the foam sheet stock overlaps the leading edge previously held in position by vacuum applied through apertures 143 in mandrel 56. At this time the mandrel halts its arcuate path and the surfaces of the foam material between the leading and trailing edges are heat softened under the influence of hot air egressing from heat dispensing nozzle 230. After sufficient heat has been conveyed to the materials and at such point where they become tacky, the tip of sealing bar assembly 252 then swings into position against the overlapped leading and trailing edges of the foam sheet material and presses them into sealing relationship with one another by using the surface of the mandrel as a backup mandrel. The sealing bar assembly, which is stationary and does not move with the drum assembly, then moves away from the surface of the mandrel. The finger mechanism 133 remains in contact with the foam cylinder 130, thus assuring that it does not change its position along the axial extent of mandrel 56. As the mandrel rotates to station 3, there is no change in its position and the newly made side seal is permitted to cool and strengthen its bond. Upon indexing to station 4, the cam track section 192 is activated, thus causing the ejection collar 148 to move slightly along the axial extent of mandrel 56. This slight movement of the ejection collar 148 causes the foam cylinder 130 to protrude slightly beyond the end of mandrel 56. Thus the foam sheet material protruding beyond the end of the mandrel is quite receptive to heat being applied thereto. The mandrels are then indexed to station 5, which is 180 degrees counterclockwise from the top dead station number 1. At station number 5, as well as station number 6, heat is applied by means of hot air or radiation to the free standing foam material protruding beyond the end of mandrel 56. Because the foam sheet material is oriented, it will shrink in the circumferential direction under the influence of the applied heat. The foam sheet material softens to a considerable degree and its diameter is reduced markedly. As the mandrel 56 arrives at station 7, the bottom forming die 275 is actuated and moves into position against the end of the softened foam cylinder 130. The die 275 forms a small flanged hole or aperture in the bottom of the foam sleeve. The die 275 is then retracted and following its retraction, the finger 131 is released from its grasp of the foam cylinder 130 sidewall and the ejection collar 148 pushes the foam cylinder 130 off mandrel 56 where it is then dropped under the influence of gravity to pneumatic tube 277 where it is transported to the assembly or filling line.

What is claimed is:

1. An apparatus for the manufacture of a container of heat-shrinkable thermoplastic material comprising sleeve winding means for forming an open ended sleeve with a liquid impervious side seam, drum means mounted for rotation about its longitudinal axis and supporting a plurality of container mandrels which rotate about their own axis in synchronization with the rotation of said drum means, means for moving said sleeve in a longitudinal direction along the surface of said mandrel means, heat dispensing means positioned adjacent said drum and mandrel means for heat softening and shrinking at least a portion of said sleeve into partial conformity with the container mandrel supporting said sleeve, means for forming a portion of the heat softened sleeve into a partial end closure for said container and container removal means for removing said container from said mandrel.

2. An apparatus for the manufacture of a container of heat-shrinkable thermoplastic material comprising sleeve winding means for forming an open ended sleeve with a liquid impervious side seam, drum means, mounted for rotation about a horizontal axis, and supporting a plurality of container mandrels, each in radial alignment with said drum means, means for rotating said mandrels about their own axis as they are translated in an arcuate path by said drum means, an array of heat dispensing means positioned adjacent said drum means for heat softening and shrinking at least a portion of said sleeve into partial conformity with the exterior surface of the mandrel supporting said sleeve, means for pressing a portion of the heat softened sleeve into an end for said container and container ejection means for removing said container from said mandrel.

3. Apparatus for the manufacture of a container of heat-shrinkable thermoplastic material comprising sleeve winding container mandrels for forming an open ended cylindrical sleeve with a liquid impervious side seam, drum means mounted for rotation about a horizontal axis and carrying a plurality of said mandrels which are circumferentially based one from the other and are in radial alignment and carried by said drum means, said mandrels positioned adjacent to a foam sheet metering and severing means, means for holding said foam sheet in contact with said mandrel while a sleeve is formed by the rotation of said mandrel about its longitudinal axis, an array of heat dispensing means positioned adjacent said drum means for heat softening and shrinking at least a portion of said sleeve into partial conformity with the exterior surface of the mandrel supporting said sleeve, means for pressing a portion of the heat softened sleeve into an apertured end for said container and ejection means coacting with said mandrel for removing said container from said mandrel.

4. An apparatus for the manufacture of containers of heat-shrinkable thermoplastic material comprising sleeve winding container mandrels for supporting open ended cylindrical sleeves, said sleeves having a liquid impervious side seam, drum means mounted for rotation about a horizontal axis and carrying a plurality of circumferentially spaced container mandrels, each in radial alignment and perpendicular with the rotational axis of said drum means, means for rotating said mandrels in synchronization with said drum means, means for dispensing a length of foam sheet material to said mandrel, grasping means associated with said mandrel for grasping said sheet material, and means for sealing said side seam in situ on said mandrel, and array of heat dispensing means positioned adjacent said drum means for heat softening and shrinking at least a portion of said sleeve into partial conformity with the exterior surface of the mandrel supporting said sleeve, means positioned adjacent to and in radial alignment with the container mandrels for pressing a portion of the heat softened sleeve into an apertured end closure for said container and ejection means associated with said container mandrel for removing said container from said container mandrel.

5. An apparatus for the manufacture of containers of heat-shrinkable thermoplastic material comprising sleeve winding mandrels for forming open ended cylindrical sleeves, from rectangular shaped blanks, upon said mandrels, said sleeve having a liquid impervious side seam, drum means mounted for rotation about a horizontal axis and carrying a plurality of container mandrels, each equally spaced circumferentially from each other and in radial alignment and perpendicular with the rotational axis of said drum means, means for thermally conditioning foam sheet stock as it advances toward said mandrels, means for grasping and advancing said sheet stock toward said mandrel, means for severing a rectangularly shaped blank of foam sheet material, means for holding the leading edge of said blank against said mandrel surface, means to conform the blank to the surface of said mandrel while said mandrel is being rotated about its longitudinal axis and is being translated about an arcuate path as said drum rotates about its longitudinal axis, means for applying a heated fluid to the leading and trailing edges of said blank, means for sealing said edges together to form an in situ side seal on said cylindrical sleeve, an array of fluid dispensing means positioned adjacent said drum means for heat softening and shrinking at least a portion of said sleeve into partial conformity with the exterior surface of the container mandrel supporting said sleeve, means positioned to and in radial alignment with the container mandrel for pressing at least a portion of the end into a closure for said container, an ejection means associated with said container mandrel for removing said container from said container mandrel.

6. An apparatus for the manufacture of containers of heat-shrinkable thermoplastic material comprising sleeve winding mandrels for forming open ended cylindrical sleeves, from rectangular shaped blanks, on said mandrels, said sleeves having a liquid impervious side seam, drum means mounted for rotation about a horizontal axis and carrying a plurality of sleeve mandrels, each equally spaced circumferentially from one another and in radial alignment and perpendicular with the rotational axis of said drum means, means for thermally conditioning foam sheet stock as it advances toward said mandrels, means for grasping and advancing said sheet stock toward said mandrels, means for severing a rectangularly shaped blank of foam sheet material, means for holding the leading edge of said blank against said mandrel surface, means to conform the blank to the surface of said mandrel while said mandrel is rotated and translated, means for applying a heated fluid to the leading and trailing edges of said blank, means for sealing said edges together to form an in situ side seal on said cylindrical sleeve, an array of fluid dispensing means positioned adjacent said drum means for heat softening and shrinking at least a portion of said sleeve into partial conformity with the exterior surface of the container mandrel supporting said sleeve, means positioned adjacent to and in radial alignment with the container mandrel for pressing at least a portion of the end into an apertured end closure for said container, an ejection means associated with said container mandrel for removing said container from said container mandrel.

7. An apparatus for the manufacture of containers of heat-shrinkable thermoplastic material comprising sleeve winding mandrels for forming open ended cylindrical sleeves from rectangular shaped blanks, having a major amount of orientation in the circumferential direction, said sleeves having a liquid impervious side seal formed from the overlapped ends of said blank, drum means mounted for rotation about a horizontal axis and carrying a plurality of synchronously rotatably driven mandrels each equally spaced circumferentially from each other and in radial alignment and perpendicular with the rotational axis of said drum means, fluid means for thermally conditioning foam sheet stock as it advances linearly toward said mandrels, means for grasping and advancing said sheet toward said mandrel, means for severing a rectangularly shaped blank of foam sheet material, means for holding the leading edge of said severed blank against said mandrel surface, roller means to conform the blank to the surface of said mandrel while said mandrel is rotated and translated, means for applying a heated fluid to the leading and trailing overlapped edges of said blank, means for sealing said edges together to form an in situ side seal on said cylindrical sleeve, means positioned adjacent to said container mandrel path for positioning said sleeve in proper location on said container mandrel so that a portion of the sleeve protrudes beyond the end of the container mandrel, an array of fluid dispensing means positioned adjacent said drum means for heat softening and shrinking at least a portion of said sleeve into partial conformity with the exterior surface of the container mandrel supporting said sleeve, means positioned adjacent to said drum means for forming the ends of the heat softened sleeve, means positioned adjacent to and in radial alignment with the container mandrel for pressing the heat softened formed portion of the sleeve into an apertured closure for said containers, an ejection means positioned on said container mandrel for removing the container from said container mandrel.

8. An apparatus for the manufacture of containers of heat-shrinkable thermoplastic foam sheet material comprising sleeve winding mandrels for forming a plurality of open ended cylindrical sleeves, from rectangular shaped blanks, having a major amount of orientation in the circumferential direction, on said mandrels, said sleeves having a liquid impervious side seam formed from the overlapped ends of said blank, drum means mounted for rotation about a horizontal axis and carrying a plurality of synchronously driven container mandrels, each rotatable about their individual longitudinal axis, and aligned in a plurality of rows and each equally spaced circumferentially from each other in said rows and perpendicular with the rotational axis of said drum means, means for thermally conditioning said foam sheet by heated fluid means as said foam sheet stock advances toward said mandrels, means for grasping the top edge of said foam sheet stock and advancing said sheet stock toward said mandrels, means for severing a rectangularly shaped blank of foam sheet material, means for holding the leading edge of said blank against said mandrel surface, means to conform the blank to the surface of said mandrel while said mandrel is rotated and translated by said drum means, means for applying a heated fluid to the leading and trailing edges of said blank, means for sealing said edges together to form an in situ side seal on said cylindrical sleeve, means positioned adjacent to said container mandrel paths for positioning a plurality of sleeves in proper location on said container mandrels so that a portion of the sleeve protrudes beyond the ends of the container mandrels, and an array of fluid dispensing means positioned adjacent said drum means for heat softening and shrinking at least a portion of said sleeves into partial conformity with the exterior surface of the respective container mandrels supporting said sleeves, means positioned adjacent to said drum means for forming apertured ends on the heat softened sleeves, means associated with container mandrels for forming reinforced rims on the formed apertured end of said sleeves and ejection means positioned on said container mandrel for removing the containers from said container mandrels.

9. An apparatus for the manufacture of containers of heat-shrinkable thermoplastic material comprising a plurality of sleeve winding mandrels for forming a plurality of open ended cylindrical sleeves, from rectangular shaped blanks, having a major amount of orientation in the circumferential direction, said sleeves having a liquid impervious side seam formed from the overlapped leading and trailing edge of said blank, drum means mounted for rotation about a horizontal axis and carrying a plurality of container mandrels, each capable of rotation about its longitudinal axis and aligned in a plurality of concentric rows and each equally spaced circumferentially from each other in said rows and perpendicular with the rotational axis of said drum means, means for thermally conditioning by fluid means, foam sheet stock as it advances linearly toward said mandrels, means for grasping said foam sheet stock by the top thereof and advancing said sheet stock toward said mandrel, means for severing a rectangularly shaped blank of foam sheet material from said advancing stock, means for holding the leading edge of said blank against said mandrel surface, means to conform the blank to the surface of said mandrel by roller means while said mandrel is rotated and translated synchronously by said drum means, means for applying a heated fluid to the leading and trailing edges of said blank, means for sealing said overlapped edges together to form an in situ side seal on said cylindrical sleeve, means positioned adjacent and in association with said container mandrels for positioning said sleeves in proper location on said container mandrels so that a portion of the sleeve protrudes beyond the ends of the container mandrels, an array of fluid dispensing means positioned adjacent said drum means for heat softening and shrinking at least a portion of said sleeves into partial conformity with the exterior surface of the respective container mandrels supporting said sleeves, means positioned adjacent to said drum means for forming apertured ends on the heat softened sleeves, means positioned adjacent to and in radial alignment with the container mandrels for pressing the heat softened portion of a plurality of sleeves into apertured closures for said containers, an ejection means positioned on each container mandrel for removing the containers from said mandrels.

10. An apparatus for the manufacture of containers of heat-shrinkable thermoplastic material comprising a plurality of sleeve winding mandrels all driven in synchronization for rotation about their individual axes, for forming a plurality of open ended cylindrical sleeves, from rectangular shaped blanks, having a major amount of orientation in the circumferential direction, said sleeves having a liquid impervious side seam formed from the overlapped ends of said blank, drum means mounted for rotation about a horizontal axis and carrying a plurality of said container mandrels aligned in four concentric rows and each equally spaced cicumferentially from each other in said rows and perpendicular with the rotational axis of said drum means, a plurality of individual means for thermally conditioning foam sheet stock as it advances linearly toward said mandrels, means for grasping the top edge of said linearly advancing sheet stock and advancing said sheet stock toward said mandrel, means for positioning said sheet stock prior to the severance thereof, means for severing a rectangularly shaped blank of foam sheet material, means for holding the leading edge of said blank of sheet stock against said mandrel surface, roller means to conform the blank to the surface of said mandrel while said mandrel is rotated and translated by the driving force of said drum, means for applying a heated fluid to the leading and trailing edges of said blank upon the completion of its being wound into a cylindrical shape, means for sealing said edges together to form an in situ side seal on said cylindrical sleeve, means positioned on each container mandrel for positioning said sleeve in proper location on said mandrels so that a portion of the sleeves protrudes beyond the ends of the container mandrels, an array of fluid dispensing means positioned adjacent said drum means so that said container mandrels pass thereby, said fluid dispensing means heat softening and shrinking at least a portion of said sleeves into partial conformity with the exterior surface of the respective container mandrels supporting said sleeves, means positioned adjacent to said drum means for forming apertured ends on the heat softened sleeves, means positioned adjacent to and in radial alignment with the container mandrels for pressing the heat softened portion of a plurality of sleeves into apertured end closures for said containers, an ejection means positioned on said container mandrels for removing the containers from said container mandrels.

11. An apparatus for the manufacture of push-up cup-like containers of heat-shrinkable thermoplastic foam sheet material comprising a plurality of cylindrical sleeve winding mandrels all driven in synchronization for rotation about their individual axes, for forming a plurality of open ended cylindrical sleeves, from rectangular shaped blanks, having a major amount of orientation in the circumferential direction, said sleeves having a liquid impervious side seam formed from the overlapping leading and trailing ends of said blank, drum means mounted for indexing rotation through a plurality of steps about a horizontal axis and carrying a plurality of container mandrels aligned in four axially spaced arcuate rows and each equally spaced circumferentially from each other other in said arcuate rows and perpendicular with the rotation axis of said drum means, said container mandrels in said four arcuate rows forming linear rows parallel to the axis of rotation of said drum means, means for thermally conditioning foam sheet stock as it advances toward said mandrels, means for grasping the top edge of said sheet stock material and advancing it linearly toward said mandrel, means for biasing against said foam sheet to stabilize it, means for severing a rectangularly shaped blank of foam sheet material, means for holding the leading edge of said foam sheet stock blank against said sleeve winding mandrel surface, means to conform the blank to the surface of said cylindrical mandrel while said sleeve winding mandrel is rotated and translated by said drum means, means for applying a heated fluid to the leading and trailing edges of said blank, means for sealing said edges together to form an in situ side seal on said cylindrical sleeve, means positioned adjacent to said container mandrels for positioning said sleeves in proper location on said container mandrels so that a portion of the sleeves protrudes beyond the ends of the container mandrels, an array of heated fluid dispensing means positioned adjacent said drum means so that said container mandrels pass thereby, fluid dispensing means heat softening and shrinking said sleeve into partial conformity with a portion of the exterior of the respective container mandrels supporting said sleeves, means for positioning adjacent to said drum means for forming apertured ends on the heat softened sleeves, means positioned adjacent to and in radial alignment with the container mandrels for pressing the heat softened portion of a plurality of sleeves in a linear row into apertured end closures for said containers, an ejection means positioned on said container mandrels for removing the containers from said container mandrels, transporting means for transporting said containers away from said container mandrels.

12. A machine for the manufacture of cup-shaped open bottomed containers of heat-shrinkable oriented thermoplastic material comprising a base structure and sleeve winding means positioned thereon for forming an open ended sleeve with a liquid impervious side seam, upright support plates attached to said base structure, motor means attached to one of said plates, rotatable drum means with an axis of rotation mounted to one of said plates and positioned adjacent said motor means, gear means connected between said motor means and said drum means for rotating said drum means, a plurality of outwardly cantilevered individually rotatable container mandrels attached to said drum means, means within said drum means to rotate said mandrels about their individual axes in synchronization with the rotation of said drum, heat dispensing means positioned adjacent said drum means for heat softening and shrinking at least a portion of said sleeve into partial conformity with the container mandrels supporting said sleeve, means for forming a portion of the heat softened sleeve into an apertured end closure for said container and container removal means for removing said container from said mandrel.

13. A machine as claimed in claim 12 wherein said drum means contains a plurality of container mandrels spaced in radial alignment about and attached to said drum means.

14. A machine as claimed in claim 12 wherein said mandrels rotate about their longitudinal axis in synchronization with said drum means.

15. A machine as claimed in claim 14 wherein said container mandrels are positioned in a plurality of arcuately aligned rows about said drum means.

16. A machine as claimed in claim 15 wherein said container mandrels are spaced an equal circumferential distance from one another in their respective arcuate rows.

17. A machine as claimed in claim 15 wherein the mandrels in said arcuate rows also form rows parallel to the rotational axis of said drum means.

18. A machine as claimed in claim 12 wherein a length of foam sheet stock material is fed in a direction toward said mandrels in an intermittent fashion.

19. A machine as claimed in claim 12 wherein a knife means is employed to sever rectangular shaped blanks of foam sheet stock material.

20. A machine as claimed in claim 18 where said intermittent feed is achieved by grasping the top edge of the foam sheet stock material.

21. A machine as claimed in claim 12 wherein the foam sheet stock material is held by a finger mechanism in close contact with the exterior surface of said mandrel.

22. A machine as claimed in claim 12 wherein roller means is employed to hold the foam sheet stock material in close proximity to the mandrel while said foam sheet stock material is being wound around said mandrel.

23. A machine as claimed in claim 12 wherein a sealing bar means is employed to effect the side seal seam of the foam sheet stock cylinder thus formed.

24. The method of forming containers from heat-shrinkable plastic sheet material including the steps of:
   (a) feeding a ribbon of plastic material to a container forming apparatus,
   (b) conditioning said material by fluid heat means,
   (c) severing a rectangular shaped length of sheet material from said ribbon of plastic material,
   (d) winding said shaped length of sheet material about a mandrel to form a sleeve while said mandrel is being rotated about its longitudinal axis,
   (e) conveying said sleeve about an arcuate path, the axis of rotation of which is horizontal,
   (f) heating the sleeve so that it conforms in part to the exterior configuration of the container mandrel,
   (g) forming a bottom closure on said sleeve by pressing a portion of the heat conditioned sleeve that protrudes beyond the end of the mandrel against said mandrel,
   (h) ejecting said container from said container mandrel.

25. The method of forming a container as claimed in claim 24 wherein the plastic sheet material is a closed cell foam.

26. The method of forming a container as claimed in claim 25 wherein the plastic sheet material is oriented.

27. The method of forming a container as claimed in claim 26 wherein the orientation is predominantly in the circular direction around the sleeve.

28. The method of forming a container as claimed in claim 27 wherein a major constituent of the plastic sheet material is polystyrene.

29. The method of forming containers from heat shrinkable plastic sheet material including the steps of:
   (a) feeding a ribbon of plastic sheet material to a forming apparatus,
   (b) subjecting said material to fluid heat means,
   (c) severing a rectangular shaped length of sheet material from said ribbon,
   (d) forming said rectangular shaped length of sheet material into a cylindrically shaped sleeve having a lapped liquid impervious side seam by causing said sleeve to be wound about a cylindrical sleeve forming mandrel while said mandrel is being rotated about its longitudinal axis,
   (e) positioning the sleeve on said mandrel with a portion of the sleeve extending beyond the end of said mandrel,
   (f) conveying said sleeve about an arcuate path, the axis of rotation of which is horizontal,
   (g) heating the sleeve so that it conforms in part to the exterior configuration of the mandrel,
   (h) forming an apertured bottom closure on said sleeve by compressing the heat softened portion of the sleeve against the end of said mandrel, and
   (i) ejecting said container from said mandrel.

30. The method for forming a container as claimed in claim 29 wherein the plastic sheet material is a closed cell foam.

31. The method of forming a container as claimed in claim 30 wherein the plastic sheet material is oriented.

32. The method of forming a container as claimed in claim 31 wherein the orientation is predominantly in the circular direction around the sleeve.

33. The method of forming a container as claimed in claim 32 wherein a major constituent of the plastic sheet material is polystyrene.

34. The method of forming a container as claimed in claim 32 wherein the apertured bottom of the container is flanged.

35. The method of forming a container as claimed in claim 32 wherein the plastic sheet material is of laminar construction.

* * * * *